Sept. 7, 1948. I. H. WILSEY 2,449,030
TARGET PRACTICE APPARATUS
Filed March 9, 1942 11 Sheets-Sheet 1

Inventor
Irven H. Wilsey
By
Parker, Carlson, Pitzner & Hubbard
Attorneys.

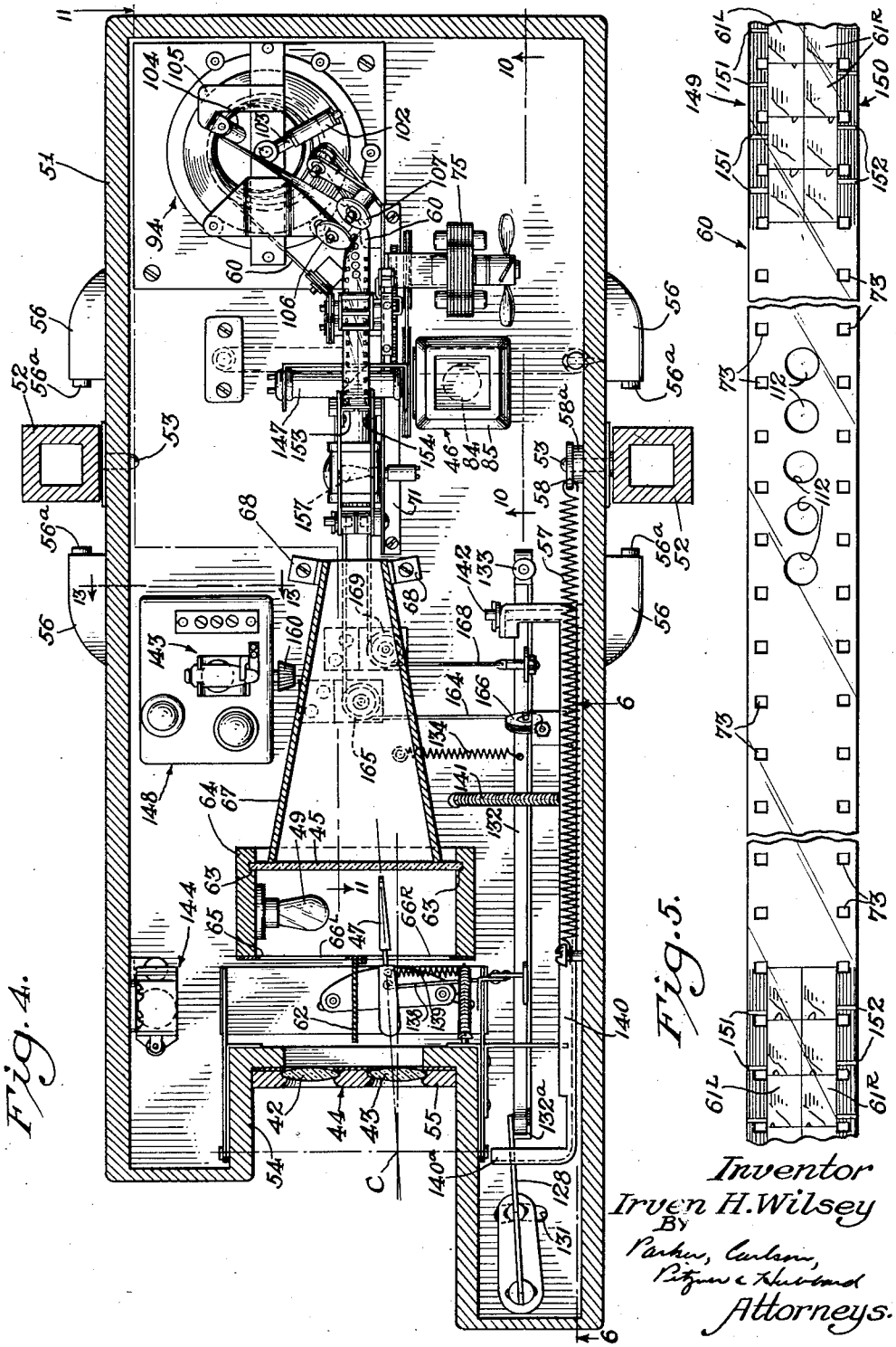

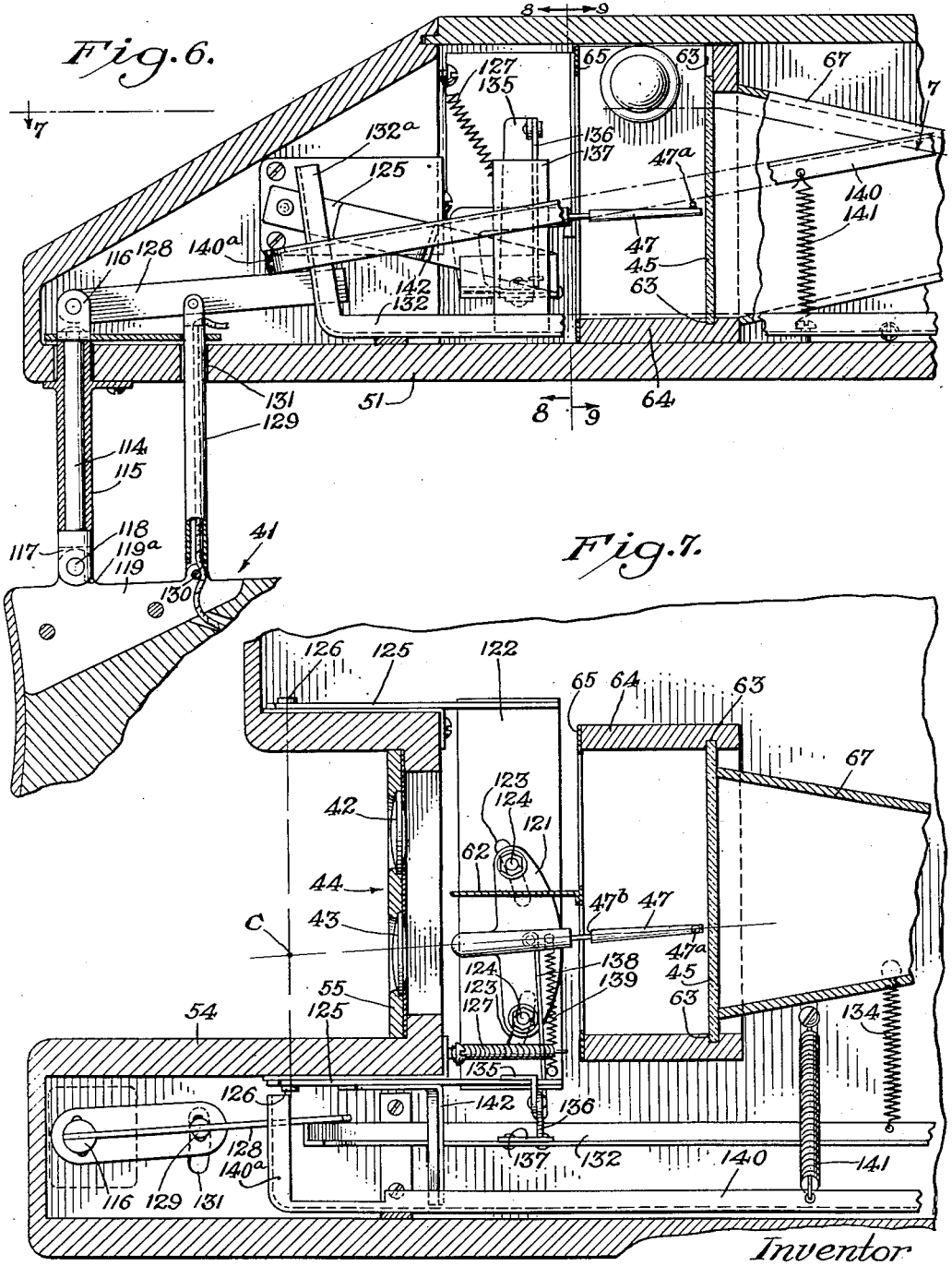

Sept. 7, 1948.　　　　　I. H. WILSEY　　　　　2,449,030
TARGET PRACTICE APPARATUS
Filed March 9, 1942　　　　　　　　　　　11 Sheets-Sheet 4
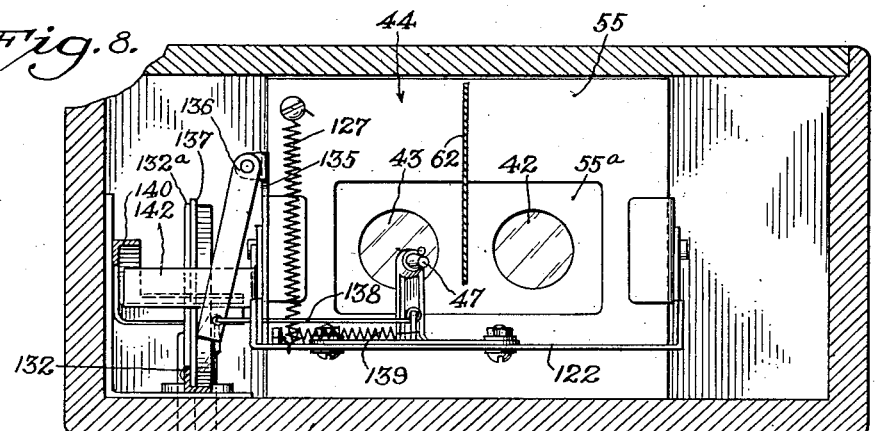
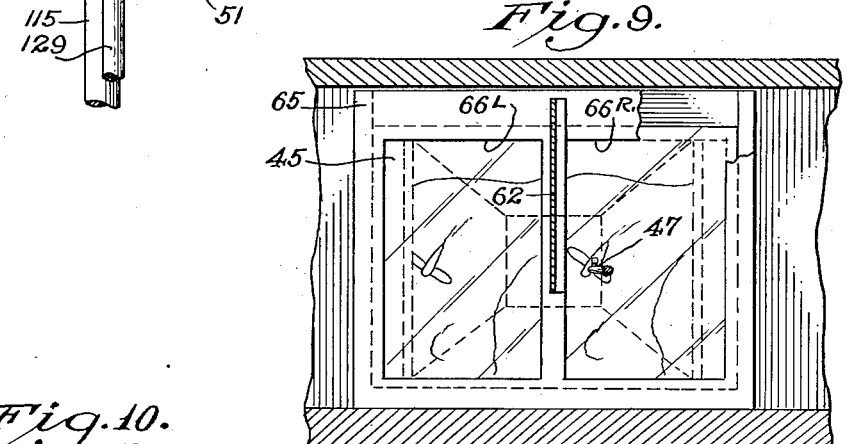
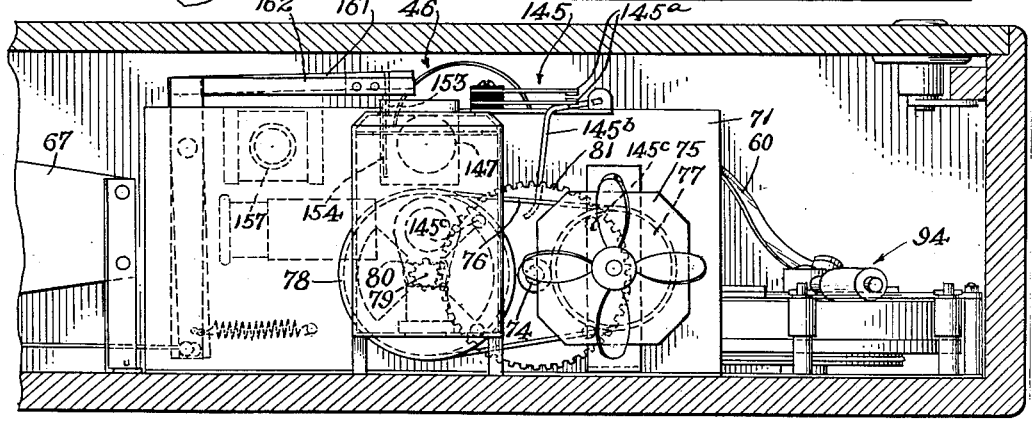
Inventor
Iryen H. Wilsey Sept. 7, 1948. I. H. WILSEY 2,449,030
TARGET PRACTICE APPARATUS
Filed March 9, 1942 11 Sheets-Sheet 5
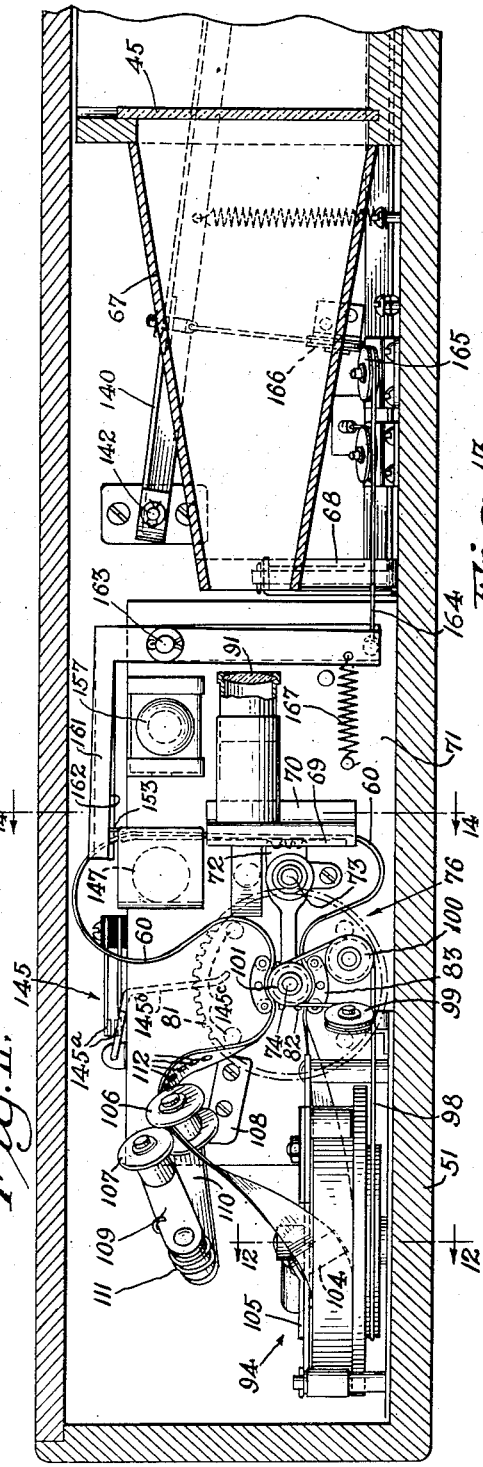
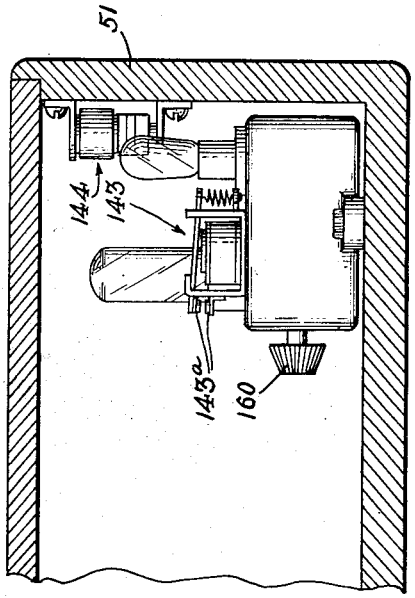
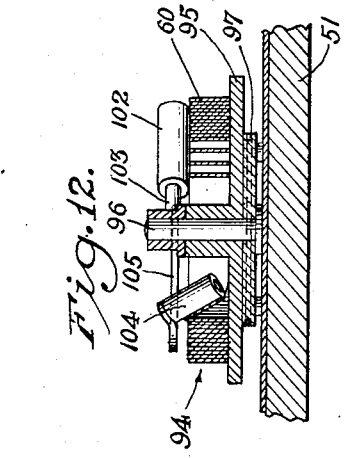
Inventor
Irven H. Wilsey
BY
Parker, Carlson, Pitzner & Hubbard
Attorneys.

Sept. 7, 1948.  I. H. WILSEY  2,449,030
TARGET PRACTICE APPARATUS
Filed March 9, 1942  11 Sheets-Sheet 6
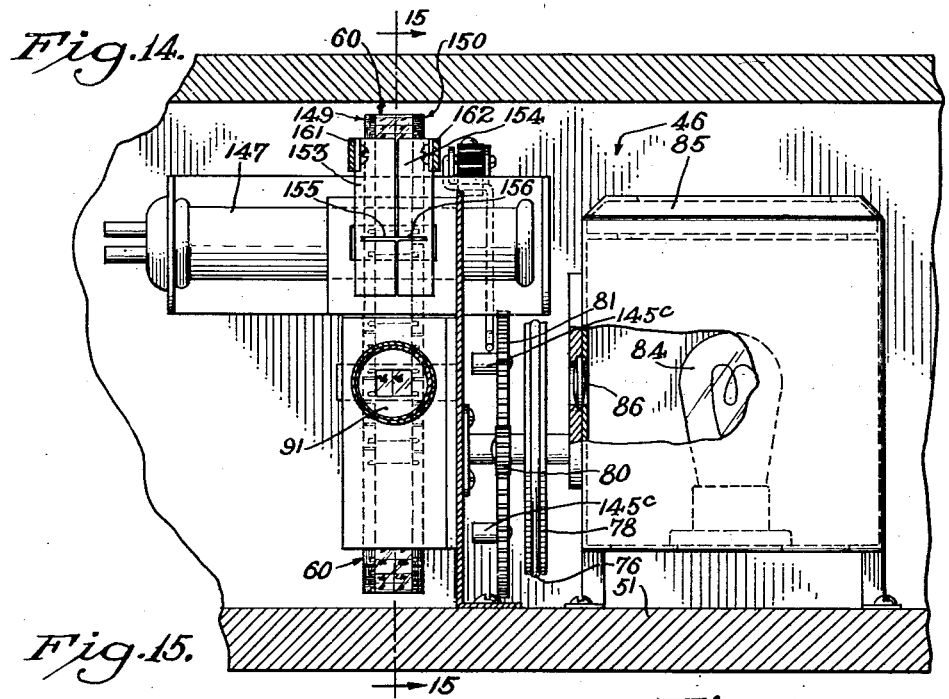
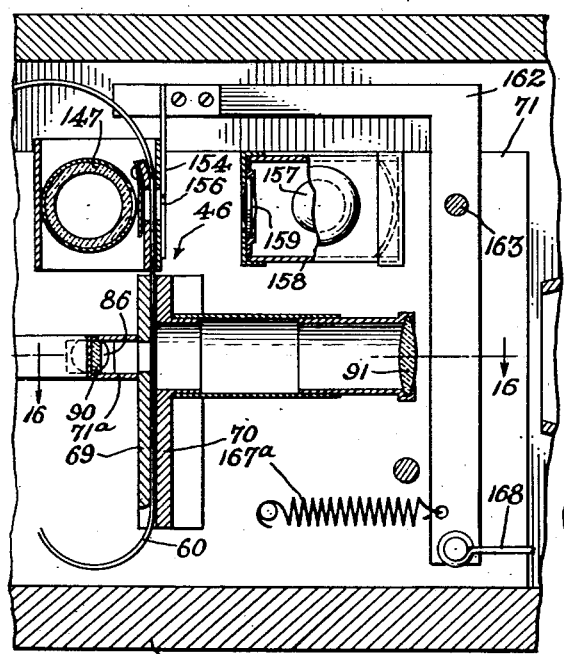
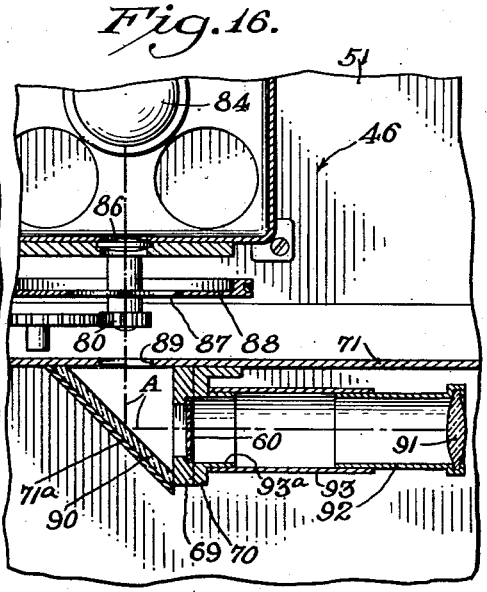
Inventor
Iryen H. Wilsey
By
Parker, Carlson, Pitzner & Hubbard
Attorneys.

Sept. 7, 1948.   I. H. WILSEY   2,449,030
TARGET PRACTICE APPARATUS
Filed March 9, 1942   11 Sheets-Sheet 7
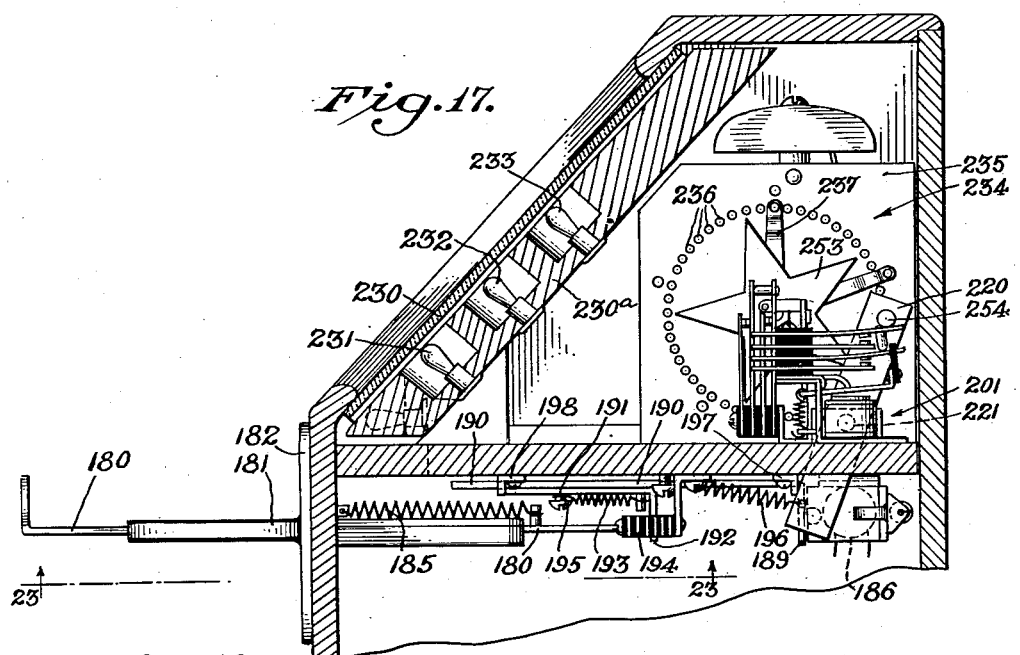
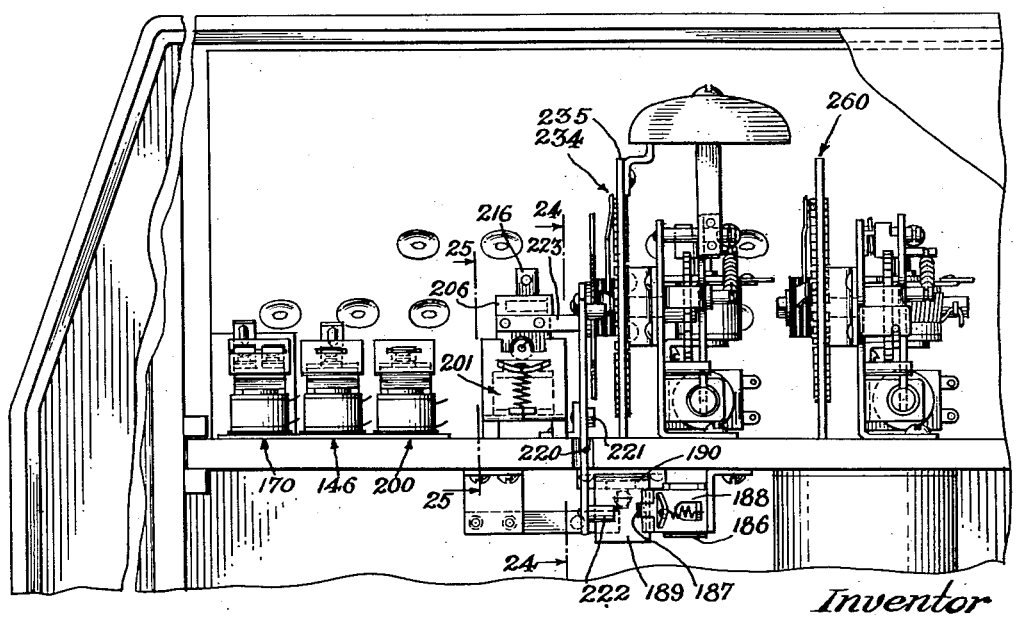
Inventor
Irven H. Wilsey
BY
Parker, Carlson, Pitzner & Hubbard
Attorneys.

Sept. 7, 1948.  I. H. WILSEY  2,449,030
TARGET PRACTICE APPARATUS
Filed March 9, 1942  11 Sheets-Sheet 8

Inventor
Irven H. Wilsey
By
Parker, Carlson, Pitzner & Hubbard
Attorneys.

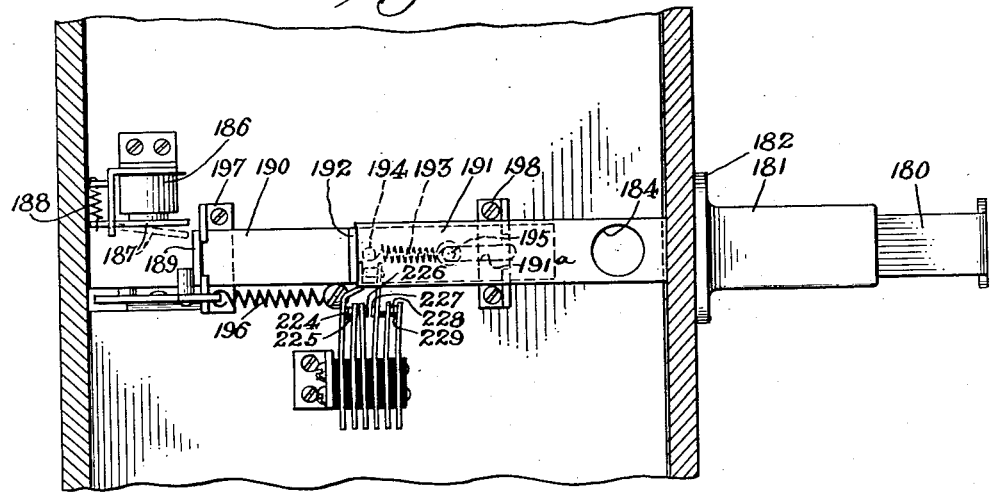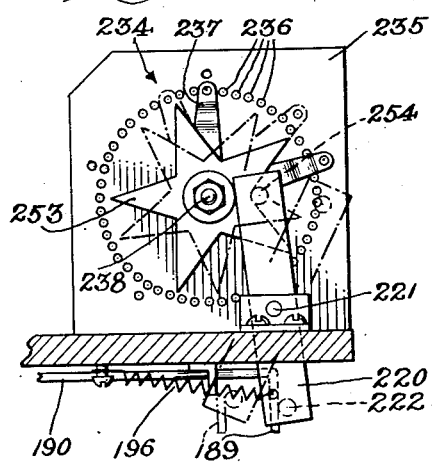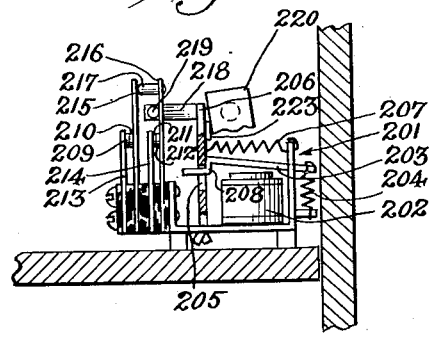

Sept. 7, 1948.   I. H. WILSEY   2,449,030
TARGET PRACTICE APPARATUS
Filed March 9, 1942   11 Sheets-Sheet 11
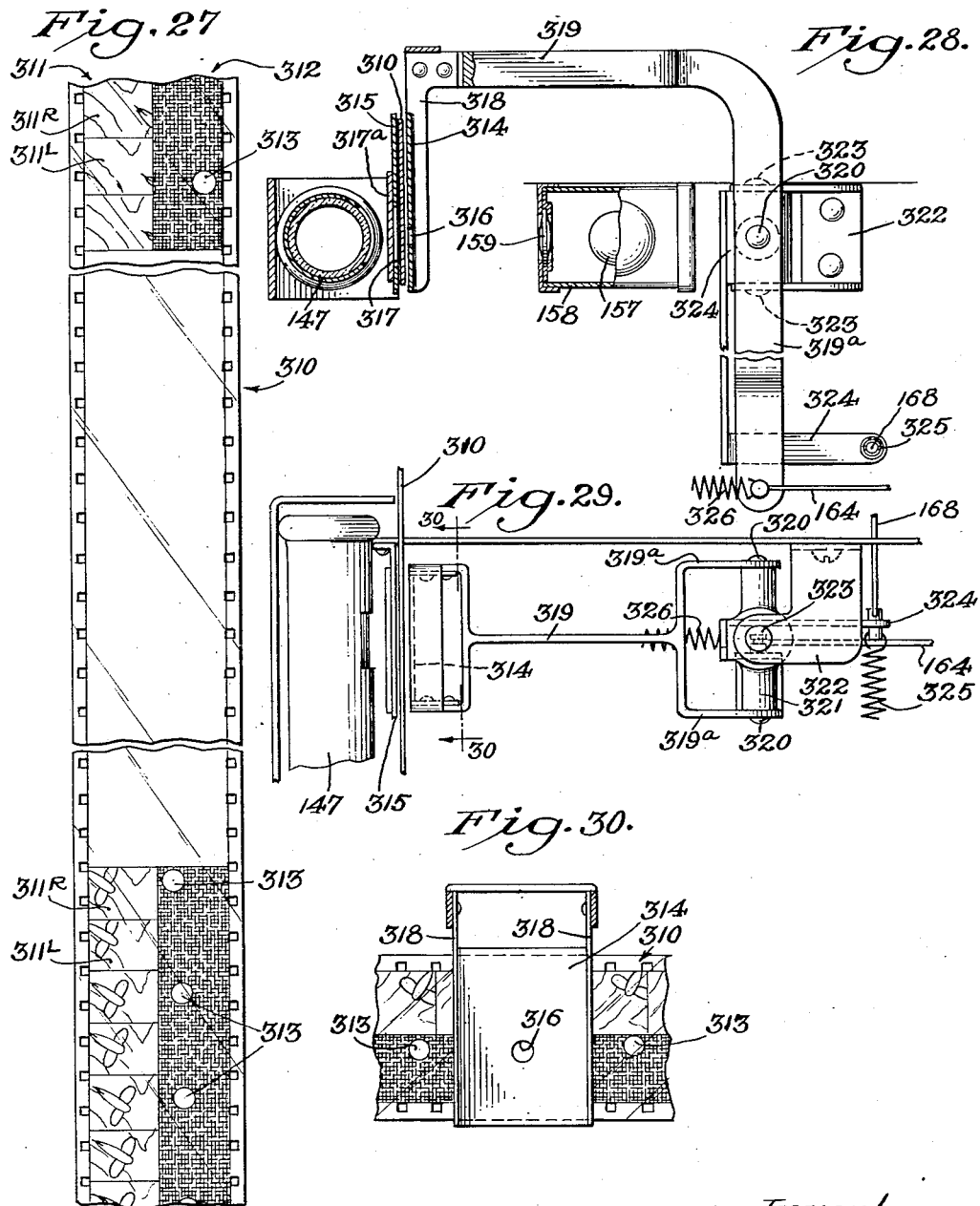

Patented Sept. 7, 1948

2,449,030

UNITED STATES PATENT OFFICE 2,449,030

TARGET PRACTICE APPARATUS

Irven H. Wilsey, Chicago, Ill.; Ruth Ann Wilsey executrix of said Irven H. Wilsey, deceased Application March 9, 1942, Serial No. 433,961

3 Claims. (Cl. 273—101.2)

The present invention pertains to target practice apparatus and is suitable for use either in technical gunnery training or as an amusement device.

One general object of the invention is to provide such an apparatus in which a target image is presented with extreme realism, both as to appearance and movement, and in such manner that conditions of actual aiming and firing are simulated with a high degree of exactitude, although by means of a compact and portable apparatus of such character that no live ammunition is required.

More particularly it is an object of the invention to provide an apparatus of the type indicated in which a target image or scene is projected on a screen from a moving picture film, and in which the apparatus is of such character that all view of the surroundings is excluded from the operator's range of vision when he is watching the target scene on the screen, wherefore even though the latter is small and part of a very compact projection apparatus, the illusion of normal or life size for the objects shown on the screen is created.

Another object is to provide such an apparatus embodying a novel target image arrangement in which the sense of realism is enhanced by utilizing stereopticon or so-called three-dimension images projected from a motion picture film for portraying the target scene.

Another object is to provide an apparatus of the type described in which a full size gun or other such aimable device can be manipulated by the operator and a simulated sight is arranged to move in accordance with such manipulation while in position to be viewed in conjunction with a target scene projected on a screen whereby the operator is afforded the illusion that the simulated sight which he sees in conjunction with the target scene is actually that of the full sized gun or other aimable device which he is manipulating.

Another object is to provide a target apparatus, in which a target image is projected on a screen from a moving picture film, a novel arrangement for utilizing a control track on the film itself to control the scoring of "hits" by a user who is simulating firing of a weapon at the target image.

Another object is to provide an apparatus of the type set forth in which a target image is projected on a screen from a moving picture film and in which a novel arrangement is provided for registering "hits," scored by the proper manipulation of a gun or other aiming device relative to the projected image, through the provision of an indicator actuated under the control of the registration of a light source and an aperture in an opaque mask on the film, the location of the aperture being correlated in position with that of the target image on the film and the mask and light source being arranged to be brought into registration by manipulation of the gun or other aiming apparatus.

Still another object is to provide a high speed scoring mechanism particularly suited for use with a moving-picture-projected target image class of target practice apparatus.

The invention also resides in various structural improvements and novel correlations and combinations of the parts by means of which a self-contained, sturdy and substantially fool-proof apparatus of the general type indicated may be provided at low cost.

Further objects and advantages of the invention will become apparent as the following description proceeds, taken in connection with the accompanying drawings in which:

Fig. 4 is an enlarged longitudinal sectional view through the apparatus taken substantially along the line 4—4 in Fig. 2.

Fig. 5 is a fragmentatry detail view of the portion of the motion picture film included in the apparatus for projecting a target scene to be viewed by the user.

Fig. 6 is an enlarged longitudinal sectional view taken substantially along the the line 6—6 in Fig. 4.

Fig. 7 is an enlarged horizontal sectional view taken substantially along the line 7—7 in Fig. 6.

Fig. 8 is an enlarged transverse sectional view taken substantially along the line 8—8 in Fig. 6.

Fig. 9 is an enlarged fragmentary transverse sectional view taken substantially along the line 9—9 in Fig. 6.

Fig. 10 is an enlarged longitudinal sectional view taken substantially along the line 10—10 in Fig. 4.

Fig. 11 is an enlarged longitudinal sectional view taken substantially along the line 11—11 in Fig. 4.

Fig. 12 is a detail sectional view of the film take-up mechanism taken substantially along the line 12—12 in Fig. 11.

Fig. 13 is a detail sectional view taken substantially along the line 13—13 in Fig. 4.

Fig. 14 is an enlarged detail transverse sectional view taken substantially along the line 14—14 in Fig. 11.

Fig. 15 is a sectional view taken substantially along the line 15—15 in Fig. 14.

Fig. 16 is a fragmentary sectional view taken substantially along the line 16—16 in Fig. 15.

Fig. 17 is a longitudinal sectional view through the scoring mechanism, being taken substantially along the line 17—17 in Fig. 2.

Fig. 18 is a fragmentary rear elevation of the scoring mechanism with the casing cover removed.

Fig. 23 is a detail sectional view taken substantially along the line 23—23 of Fig. 17.

Fig. 24 is a detail sectional view taken substantially along the line 24—24 in Fig. 18, showing the rotary multi-point contactor of the units counter.

Fig. 25 is a detail sectional view taken substantially along the line 25—25 in Fig. 18, showing the trip relay for stopping the machine.

Fig. 27 is a fragmentary plan view of a modified form of moving picture film adapted for use in an apparatus embodying the present invention.

Figs. 28 and 29 are, respectively, side and plan views, the former being partially in section, of a light-control apparatus adapted for use in conjunction with the film shown in Fig. 27.

Fig. 30 is a detail sectional view taken substantially along the line 30—30 in Fig. 29.

Figure 1:
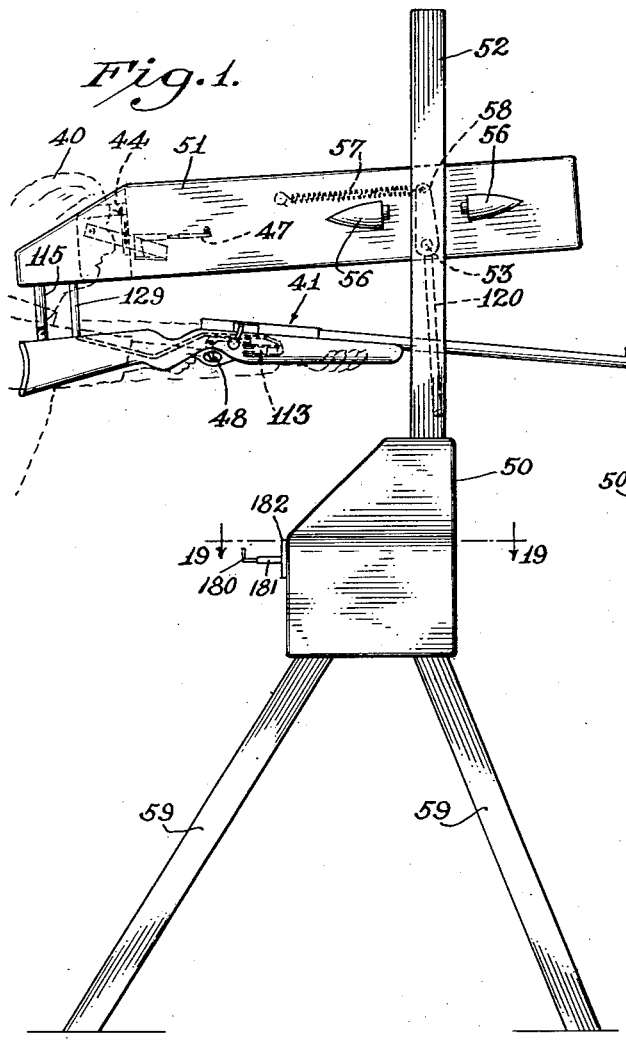
Figure 1 is a side elevation of a target practice apparatus embodying the present invention.

The present invention has been exemplified herein (see Fig. 1) as embodied in a form of apparatus particularly suited for use as an amusement device, but it will be appreciated by those skilled in the art that the invention is also applicable to purely technical gunnery practice apparatus. Consequently, even though a certain particular embodiment of the invention has been shown and described in some detail, there is no intention to thereby limit the invention to such embodiment, but, on the other hand, I intend to cover all modifications and alternative inventions falling within the spirit and scope of the invention as expressed in the appended claims.

*General arrangement and mode of operation of apparatus*

In the exemplary apparatus (see Figs. 1 and 2) the arrangement is such that an operator or user, indicated at 40, stands in front of the apparatus and holds a gun 41 with the stock pressed against his shoulder in the usual manner for firing, while looking through eye pieces 42, 43 of a viewer designated generally as 44. Through the eye pieces he sees a target scene projected on a screen 45 (Fig. 4) by a suitable motion picture projection apparatus 46 described below. Also visible through the viewer, in conjunction with the projected target scene, is a simulated sighting mechanism in the form of a replica 47 of the fore portion of the gun barrel and front sight. The arrangement is such that as the gun 41 is swung, its replica 47 moves in unison with it so that the user has the complete illusion of pointing the actual full size gun 41 at the target image projected on the moving picture screen.

Figure 2:
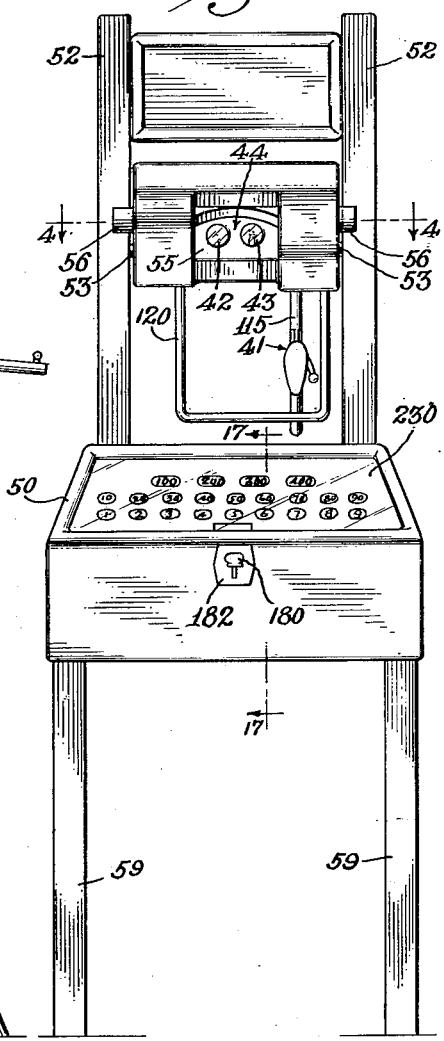
Fig. 2 is a front elevation of the apparatus shown in Fig. 1.
Figure 3:
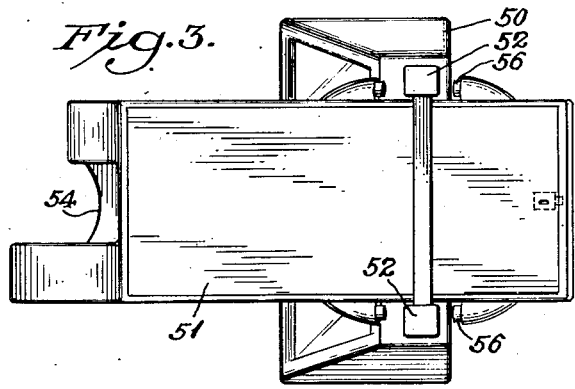
Fig. 3 is a plan view of the apparatus shown in Fig. 1.

Upon pressing the trigger 48 of the gun 41 (Fig. 1) an electric circuit is partially completed and if the sighting mechanism 47 is accurately pointed at the target image this circuit is fully completed to actuate a suitable "hit" indicator, in the present instance a red lamp 49 (Fig. 4) whose glow is visible through the eye pieces 42, 43. The details of the circuit will appear below. The "hits" thus made are totalized and the total continuously indicated by a suitable scoring mechanism in a casing 50 (Figs. 1 and 2).

Of particular note is the novel arrangement utilized for detecting proper "aiming" of the gun. In general, the latter arrangement utilizes one or more control tracks on the moving picture film, such control tracks being arranged to coact with a mechanism controlled by movement of the gun in such manner that a beam of light is permitted to fall on a light-sensitive cell or photo-tube when the sighting mechanism 47 is accurately aimed at the projected target image, all as detailed hereinafter.

As to the general layout of the parts in the exemplary apparatus, it will be observed upon reference to Figs. 1 to 4 that a compact, generally rectangular casing 51 is pivoted between upright posts 52 on trunnions 53 for movement about a horizontal axis. The front end of this casing is recessed as indicated at 54 in Fig. 3 so that the user can advance his head into the recess and thus look directly into the eye pieces 42, 43 of the viewer 44. This viewer comprises an apertured end plate or mask 55 (Figs. 2 and 4) against which the eye pieces are clamped by an inner plate 55ᵃ (Fig. 8), the end plate 55 being fixed in the apertured front end of the casing 51.

Limitation of the swinging movement of the casing 51 about its pivots or trunnions 53 is afforded by stop-projections 56, which are opposed to the uprights 52 and have rubber bumpers 56ᵃ adapted to abut against the uprights (Fig. 4). The resultant limited swinging movement of the casing 51 which is thus permitted makes it possible to adjust the position of the casing to accommodate the level of the eye pieces 42, 43 to the height of any particular user. In order to yieldably retain the casing 51 in a normal horizontal position, a tension spring 57 (Figs. 1 and 4) is utilized. One end of this spring 57 is anchored within the casing 51 and the other end is anchored to an upstanding arm 58 fixed to a sleeve 58ᵃ, which in turn telescoped over the trunnion 53 and fixed rigidly to the adjacent upright 52.

The casing 50 of the scoring mechanism is mounted on four suitable legs 59 (Figs. 1 and 2) and the uprights 52, which carry the casing 51, are in turn mounted on the scoring mechanism casing 50.

*Projection and viewing apparatus*

Various suitable target scenes may be projected onto the screen 45 from the projector 46. For example, a moving picture of an airplane performing combat or bombing maneuvers may be used, or as another example, the scene may be in a jungle with wild animals prowling about. The variety of suitable subjects is obviously nearly unlimited and can be changed to renew and stimulate interest simply by inserting a new film.

In order to afford a high degree of realism for the user of the apparatus, a stereopticon type of moving picture apparatus is preferably used. For this purpose a moving picture film 60 (Fig. 5) is utilized which has on it a target track in the form of successive pairs of frames 61L, 61R, each pair of frames bearing similar images taken at optic angles to each other in the usual manner for stereopticon or "three dimensional" photography. The images on each successive pair of frames are, in the present instance, projected onto the screen 45 simultaneously but are viewed separately by the user's two eyes, the image from the left frame 61L being viewed by the left eye and the image from the right frame 61R being viewed by the right eye. To assure proper separate viewing of the two images projected simultaneously on the screen, a separator or septum 62 (Fig. 4) is arranged to divide the field of vision, being located on the center line between the two eye pieces 42, 43. These latter eye pieces are magnifying lenses of the type commonly used in stereopticon viewers.

The screen 45, heretofore noted, is of the familiar translucent or ground glass type, onto which an image is thrown from a projector located on one side of the screen, the image being viewed from the opposite side of the screen. In the present instance the screen 45 is mounted in suitable grooves 63 (Figs. 4, 6 and 7) formed in the inner surfaces of a U-shaped supporting bracket 64 having its bottom wall fixed to the bottom wall of the casing 51 and with its side arms projecting upwardly.

On the side of this bracket 64 which is adjacent the viewer 44, is fixed a metal plate 65 of generally rectangular form (see Figs. 4 and 9) having two rectangular apertures 66L and 66R therein. These apertures serve respectively to frame the left and righthand images projected on the screen 45, and the separator 62 is fixed to the portion of the plate 65 located between these two apertures.

On the side of the screen 45, which is opposite the viewer 44, a light housing 67 (Figs. 4 and 11) tapers toward the projection apparatus 46. This light housing 67 is of truncated pyramidal form and is mounted within the casing 51 by brackets 68.

Various forms of projector and rewind mechanisms suitable for handling the moving picture film 60 are known in the art. In the illustrative arrangement the projection apparatus 46 comprises a film guide or gate made up of a pair of opposed plates 69 and 70 (Fig. 15) fixed to an upright plate or bracket 71 secured within the main housing 51. The film 60 moves downwardly (as viewed in Fig. 11) between the opposed faces of the guide plates 69, 70 with a step-by-step motion imparted to it by a pull-down device 72 engageable with sprocket holes 73 in the marginal edges of the film (see Fig. 5 for sprocket holes). The pull-down device 72 is shown in Fig. 11 as being in the form of an elongated lever having teeth or claws on its forward end and pivoted at an intermediate point on a pivot pin 73 carried by the bracket 71. The rear end of the pull-down device is engaged with a cam (not shown) on a shaft 74 so that the pull-down device is oscillated in timed relation with the rotation of this shaft. The shaft 74 extends transversely through the upright bracket 71, being journaled in it, and is driven by an electric motor 75 (Figs. 4 and 10). The motor 75 is connected by an endless belt 76, led over a pulley 77 on the motor shaft, and a pulley 78 on a second transverse shaft 79 to the latter shaft. On this shaft 79 is fixed a pinion 80 meshing with a gear 81 fixed on the shaft 74.

The portions of the film 60 leading, respectively, to and from the film gate plates 69, 70 are engaged with respective opposite sides of a feed sprocket 82 (Fig. 11) being held in position for engagement of the sprocket teeth with the sprocket holes on the film by guides 83. The sprocket 82 is fixed to the shaft 74 and thus advances the film in timed relation with the advancing movement imparted thereto by the pull-down device 72, which, as noted above, is also actuated from the shaft 74.

As to the optical system of the projector, light is projected through the successive pairs of frames on the film 60 as it passes between the film gate plates 69, 70 from a projection lamp 84 (Figs. 4 and 14) in a lamp housing 85. The light emitted from the projection lamp 84 passes through a condensing lens 86 in the side of the lamp housing (Figs. 14 to 16), thence through apertures 87 in the pulley 78 which constitutes a revolving shutter, through an aperture 89 in the supporting bracket 71 and onto a mirror 90 by which it is reflected to pass through the film 60 and thence through a projection lens 91 by which it is directed through the light housing 67 onto the screen 45. The projection lens 91 has a conventional form of adjustable mounting, being carried in the end of a sleeve 92, which is slidably received within a second sleeve or barrel 93 fixed to a tubular projection 93ᵃ on the film guide plate 70 (Fig. 16). The mirror 90 is set at an angle of 45 degrees to the axis of the beam of light falling upon it from the condensing lens 86, the mirror being carried on a support 71ᵃ fixed to the upright bracket 71. The axis of the beam of light passing from the projection lamp 84 through the lenses and film is indicated by the dot-dash line A in Fig. 16.

A take-up mechanism of the continuous rewind type is provided herein for the moving picture film 60, being designated generally as 94 (Figs. 4, 10, 11 and 12). In this mechanism 94 the film is wound in helical configuration, being unwound from the center of the helix and simultaneously wound onto the exterior of the helix. For this purpose the mechanism comprises a disk 95 (Fig. 12) journaled on an upright post 96 and revolved by means of a pulley 97 fixed to the lower side of the disk. An endless belt 98 (Fig. 11) is led over the pulley 97 and also over guide pulleys 99, 100 to a drive pulley 101 on the motor driven shaft 74. Upon reference to Figs. 4 and 12 it will be seen that the helix of film 60 rests on the upper face of the revolving disk 95, being pressed down with the lower edge of the film in frictional engagement with the face of the disk by a roller 102 which is journaled on a pin 103 projecting laterally from the post 96. The portion of the film which is continuously unwound from the inner portion of the helix of the film on the disk 95 is led over an inclined guide roller 104, carried by a bracket 105 (Figs. 4, 11 and 12), and thence over a pulley 106 and into engagement with the upper side of the feed sprocket 82. Similarly, the portion of the film 60 being fed into the helix on the disk 95 is led directly from the lower side of the feed sprocket 82 to the exterior of the helix. The disk 95 is arranged to revolve at a speed such that the portion thereof underlying the inner layer of the helix matches the speed of unwinding of the film from the helix.

Consequently, the portion of the disk 95 underlying the outer layers of the helix revolves at a greater speed than the linear speed of the film directly in contact with it so that the disk, which is in sliding frictional engagement with the edge of the film tends to pull this portion of the film and keeps the helix wound fairly tightly.

The pulley or roller 106 mentioned above is utilized, in conjunction with an opposed roller 107 (Fig. 11) as a part of the control for stopping the projector drive motor 75. It will be observed that the roller 106 is revolubly mounted on a bracket 108 fixed to the upright bracket 71 and has edge flanges between which the film 60 is received. The coacting roller 107 is, on the other hand, rotatably mounted on the outer end of an arm 109 pivoted on the end of a bracket 110 fixed on the upright bracket 71, the rollers 106 and 107 being suitably insulated from their respective supports. A torsion spring 111 urges the arm 109 to press the roller 107 against the center of the portion of film passing over the roller 106. Both the rollers 106 and 107 are made of electrically conductive metal but are normally retained out of contact with each other by the portion of film passing therebetween and which is insulating in character. In the film 60, however, a series of apertures 112 (Figs. 5 and 11) are provided at suitable intervals along the length of the film so that when these apertures 112 arrive beween the rollers 106, 107 contact between the latter is permitted. In this way an electric circuit can be completed between the rollers, and such a circuit is utilized, in a manner hereinafter described, to stop the projector drive motor 75 through the action of a cut-off relay 200 having normally open contacts 200$^a$ (see Fig. 26 for relay). It will thus be seen that by locating such groups of apertures 112 at suitable intervals along the film it can be stopped at corresponding points, or in other words, after a predetermined series of pictures have been shown on the screen.

Gun and coordinated simulated sight

Any desired form of operator-manipulable aiming mechanism may be utilized, a gun, exemplified by the gun 41 heretofore noted (Fig. 1), having been chosen for illustration here as suited to the present form of installation. The gun 41 may be an actual rifle, with the firing mechanism removed for safety, and a switch 113 installed therein and arranged to be closed whenever the trigger 48 is pulled by the user. It will be observed that the trigger 48 is L-shaped, being pivoted at the juncture of its two arms, and arranged with one arm overlying a finger of the normally open switch 113 so that when the trigger is pulled this switch finger will be depressed and the contacts of the switch thus closed.

The trigger-operated switch 113 operates in conjunction with a projector shot switch 145 (Fig. 26) to control a trigger relay 146, the latter having normally open contacts 146$^a$ and 146$^b$. The projector shot switch 145 is provided for a purpose which will hereinafter appear and comprises (see Figs. 10 and 11 as well as Fig. 26) a pair of normally open contacts 145$^a$, arranged to be closed by a pivoted arm 145$^b$ when the latter is struck by successive ones of projections or pins 145$^c$ on the gear 81. These projections are so spaced that the switch is closed once for each two pairs of images projected from the film 60. When the trigger switch 113 is held closed, the periodic closure of switch 145 thus causes the trigger relay to be energized with the same periodicity. The resultant intermittent closure of the relay contacts 146$^b$ causes an intermittent energization of a shot sounder 144, the latter having an armature which, when attracted, thumps against the side wall of the casing 51 in simulation of the sound of a shot. The other contacts 146$^a$ of the trigger relay 146 partially complete a "hit" indicator circuit as hereinafter detailed.

The support for the gun 41 is such that the user can hold the gun stock against his shoulder in the usual manner and swing the gun both laterally and vertically with as much freedom as is required to have the "feel" of actually pointing it at a target image which he sees through the viewer 44. For this purpose, the butt end of the gun stock is suspended by a vertical shaft 114 (Fig. 6), journaled for rotation in a sleeve 115. The sleeve 115 is fixed to the casing 51 and extends through the front portion of the bottom wall thereof. Yoke-shaped heads 116 and 117, fixed, respectively, to the upper and lower ends of the shaft 114, prevent endwise movement of the shaft within the sleeve 115. The lower yoke-shaped head 117 is pivotally connected to the gun stock by a pin 118 which passes through a lug 119$^a$ on a plate 119, which is inset within and fixed to the gun stock. The gun 41 can thus be swiveled laterally about the vertical axis of the shaft 114 and also be swung vertically about the axis of the transverse pin 118.

A stirrup 120 (Figs. 1 and 2) limits the lateral and downward movement of the gun, while the case 51 itself limits the upward movement of the gun. When not in use the gun is permitted to drop down on this stirrup. Preferably, the stirrup is covered with rubber so that the gun will not be injured by striking against it. The stirrup is of such dimensions as to permit such movement of the gun as is required to, in effect, "scan" the entire area of the target scene.

Of course the user cannot actually see the gun 41 when he is looking into the viewer 44, and so, in order to simulate the same, the gun replica 47, heretofore noted, is utilized. Upon reference to Fig. 1 it will be seen that the replica or simulated sighting mechanism 47 comprises an elongated tapered member generally resembling the gun barrel although more sharply tapered in order to duplicate the effect of foreshortening which a person has in looking down the top of a gun barrel. On the front end of the replica is a replica 47$^a$ of the front sight of the gun. The gun barrel replica 47 is of reduced diameter at 47$^b$ so as to permit maximum swinging of the same without interfering with the screen mask 65.

The gun replica 47 is mounted for both horizontal and vertical swinging movement about a point C indicated in Fig. 7, which is substantially coincident with the optic center of the user's right eye as he peers through the eye pieces. It will be noted that the gun replica 47 is placed in front of the right eye piece 43, rather than the left eye piece 42, since persons commonly use the right eye for sighting a gun. With the simulated sighting device or gun replica 47 thus arranged to be swiveled about the optic center of the user's sighting eye, the illusion is complete that what he sees is the actual gun 41 that he is holding to his shoulder.

In order to support the gun replica 47 for movement about the center C, it is fixed on a supporting plate 121 (Fig. 7) which is slidable on the surface of an underlying plate 122. This latter plate 122 has a pair of arcuate slots 123 therein, so fashioned that their center of curvature is at the center C. Retaining bolts 124 pass through the slots 123 and thus guide the plate 121 for lateral movement in a path conforming to the curvature of the slots 123. The underlying plate 122 is in turn fixed to a pair of supporting arms 125 arranged to swing vertically on pins 126. The axis of movement of the arms 125, about the pins 126, also passes through the center C. The gun replica 47 can thus be shifted either laterally or vertically about the center C. A tension spring 127, anchored at its opposite ends to the casing 51 and to the supporting plate 122, holds the latter yieldably in a generally horizontal position (see Figs. 6 and 7).

A linkage mechanism is provided for interconnecting the actual gun 41 and the replica 47 so that the two will always move in unison. This linkage mechanism comprises (see Fig. 6) a link 128 pivoted at one end to the yoke-shaped head 116 on the gun-supporting rod 114. Intermediate its ends, the link 128 is connected by a tubular link 129 with a pivot pin 130 on the gun stock at a point displaced forwardly of the pivot pin 118. The upright tubular link 129 passes through an arcuate slot 131 at the bottom of the casing 51. It will thus be seen that the link 128 will follow both the horizontal and vertical movements of the gun 41.

The horizontal movements of the link 128 are transmitted to the gun replica 47 through an elongated link 132 (Fig. 4) pivoted on the bottom wall of the casing 51 for horiozntal movement by a pin 133. The opposite end of the link 132 has an upstanding projection 132ª thereon which is yieldably held in contact with one side of the link 128 by a tension spring 134. Rising from the gun replica's supporting plate 122 is a bracket 135 (Fig. 8) having pivoted on it a link 136. The lower end of this link bears against an upright plate 137 fixed to the link 132 (see also Figs. 6 and 7). A transverse link 138 connects the gun replica 47 and the lower end of the link 136, being pivotally connected at its respective opposite ends to them. A tension spring 139, anchored at its opposite ends to the supporting plate 122 and to the gun replica 47, normally urges the gun replica to the left as viewed in Fig. 8. It will thus be seen that as the gun-actuated link 128 is swung toward the link 132 that the latter will be similarly shifted, whereupon the action of the spring 139 will cause the link 136 to follow the link 132, and the link 138 causes the gun replica 47 to also follow this movement. Similarly, when the gun-actuated link 128 swings in the opposite direction, the spring 134 causes the link 132 to follow it, whereupon the link 136 is thrust inward by the link 132 and it in turn thrusts the link 138 endwise so that the gun replica 47 is swung accordingly. It is to be observed that the springs and links are related as described so that there is, in effect, a yieldable connection between the gun and gun replica, wherefore the latter is protected from breakage or damage upon violent swinging of the gun 41 by an ill-humored user.

A similar linkage and spring arrangement is used to transmit the vertical motions of the gun-actuated link 128 to the gun replica 47. Thus, upon reference to Fig. 4 it will be observed that the laterally projecting end 140ª of an elongated link 140 overlies the gun-actuated link 128, the link 140 being yieldably urged into engagement with the link 128 by a tension spring 141. The link 140 is pivoted for vertical movement by pivot pin 142 at its forward end. The link 140 is L-shaped in cross section (see Fig. 8) and the laterally projecting arm 142, rigid with the adjacent supporting arm 125 of the plate 122, underlies the horizontal flange on the link 140. Thus, as the link 140 swings downward it presses down on the projection 142 and thereby swings the supporting mechanism for the gun replica 47 downward. Similarly, when the link 140 swings upward the spring 127 causes the gun replica supporting mechanism to follow it.

"Hit" indicating mechanism

In order to simulate actual gunnery conditions, the present apparatus is so organized that a "hit" indicator will be actuated only when the operator pulls the gun trigger 48 at an instant when the gun replica 47 is accurately aimed at a target image projected on the screen 45. In order to render the simultaneous proper performance of both of those acts, a condition precedent to actuation of the indicator, two switches are arranged in series relation in a scoring circuit so that both must be closed simultaneously to complete such circuit. One of these switches comprises the contacts 146ª of a trigger relay 146 (see wiring diagram in Fig. 26) controlled by the trigger switch 113, and the other comprises the contacts 143ª of a relay 143 (Figs. 13 and 26) which, in a manner hereinafter set forth, is energized to close its contacts when the gun replica 47 is accurately pointed at the projected target image. In the illustrative apparatus the indicator is shown as the lamp 49, which floods the screen 45 with a red glow when lighted upon the scoring of a "hit." Simultaneous closure of the relay contacts 146ª and 143ª, in the scoring circuit noted above, serves to energize a step-up relay 170 and its contacts 170ª, in turn close an energizing circuit for the indicator lamp 49.

The general scheme followed herein for actuating the relay 143 in response to proper sighting of the gun replica is to provide a control track or tracks on the motion picture film itself and which coact with mechanism controlled by the movement of the gun replica to energize an electric circuit when the replica is accurately aimed at the target image. In the present instance such circuit energization is effected by admitting light to a phototube or photoelectric cell 147 (Figs. 4, 14 and 26) to render the latter conductive, the current through the phototube being amplified by a vacuum tube type amplifier 148 of conventional and well-known form, and the output of the amplifier being utilized to energize the relay 143.

To govern the admission of light to the phototube 147 for the purpose noted, the control track or tracks on the moving picture film are comprised of a series of opaque masks with light-passage apertures therein, correlated in position on the masks with the position of the target image on the successive frames of the film. Coacting with these apertured masks is a mechanism, moved in unison with the gun replica, for controlling the entry of light through the mask apertures. This latter mechanism is positioned to cause entry of light through the control track mask aperture and onto the phototube, only when the gun replica 47 is accurately aimed at the projected target image.

One difficulty which immediately arises in this system, as so far outlined, is that the target image has both a lateral and vertical displacement on the film frame from any reference point which may be chosen. This means that the location of the light-aperture in the control track mask must be correlated with these two possible different dimensional shifts of the target image. Two solutions of this problem are illustrated herein. In the case of the modified form of film shown in Fig. 27, the position of the aperture in the mask is varied both laterally and longitudinally of the film in accordance with the position of the target image. On the other hand, in the film 60 of Fig. 5, which has been heretofore noted, the position of the target image is, in effect, resolved into two components or coordinates and two control tracks are provided, the location of the apertures in one control track corresponding to the lateral displacement of the target image in its frame, and the location of the apertures in the other control track corresponding to the longitudinal displacement of the image.

Turning now to the details of the control track arrangement of the film 60 shown in Fig. 5, it will be observed that two control tracks 149 and 150 are provided along the respective side edges of the film. Although these tracks appear as generally continuous opaque bands extending along the edge of the film, they are, in effect, made up of a succession of opaque masks, one for each pair of frames 61L and 61R, since only the portions of each opaque band between successive pairs of the sprocket holes 73 are actually utilized as masks. It should be observed, in passing, that this location of the control tracks on the extreme side edges of the film is desirable in that such portion of the film, which normally contains the sprocket holes, is never utilized for picture frames anyway, so that the addition of the control tracks at such points does not diminish the area of the film normally available for the picture frames.

In each of the succession of masks making up the control track 149 is a transverse, transparent bar or aperture 151 and, similarly, in each of the succession of masks making up the other control track 150 is a transverse, transparent bar or aperture 152. It should be understood that the apertures 151 and 152 are apertures only in the opaque masks and not in the film itself, since the body of the film is transparent and greater mechanical strength for the film is afforded if the actual film is not slitted or apertured. In the present instance, the location of the mask apertures 151 in the control track 149 is coordinated with the vertical displacement of the target image in corresponding film frames, while the mask apertures 152 in the other control track 150 are coordinated with the lateral displacement of the target image in corresponding film frames. That is to say, the apertures 151 are each displaced from the top edge of their corresponding mask by a distance bearing a fixed ratio to the vertical displacement of the target image in a corresponding frame of the film, while the other mask apertures 150 are each displaced a distance from the upper edge of their mask by an amount bearing a fixed ratio to the lateral displacement of the target image in a corresponding frame. The position of the apertures 151 and 152 in any particular pair of masks is desirably coordinated with the position of a target image in a pair of picture frames 61L, 61R located a distance of two or three inches along the film from such masks, since space requirements in the apparatus make it necessary for the mechanism, cooperating with the control tracks for governing the admission of light to the phototube 147, to be displaced some little distance along the film from the point at which light from the projection lamp 84 is passed through the film.

The mechanism coacting with the control tracks 149, 150 for governing the passage of light therethrough to the phototube 147 comprises, in the present instance, a pair of overlying sheet metal masks 153, 154 (Figs. 14 and 15). These latter masks 153, 154 are arranged to be moved vertically in accordance with the vertical and lateral shifting, respectively, of the gun and gun replica. These movable masks have slits or openings 155 and 156, respectively, therein, and when such slits register with the control track apertures 151 and 152, light will pass from a scanning lamp 157 to the phototube 147. It will be observed upon reference to Fig. 15 that the scanning lamp 157 is enclosed in a housing 158 and that light from it is concentrated by a condensing lens 159 on the faces of the masks 153, 154. The amplifying ratio of the amplifier 148 (Fig. 4) is adjusted by the usual control knob 160 for such amplifiers so that the output of the amplifier will only be sufficient to actuate the relay 143 when light is admitted to the phototube 147 through both control tracks, the admission of light through a single control track being insufficient to actuate the relay.

A suitable linkage is provided for moving the masks 153, 154 in accordance with the operator's movement of the gun replica 47 and gun 41. In the present instance (see Figs. 4, 10, 11, 14 and 15), the masks 153 and 154 depend, respectively, from horizontally projecting arms of L-shaped levers 161 and 162. These levers are pivoted to swing about a horizontal pivot pin 163 fixed to the upright supporting bracket or plate 71. The lower end of the supporting lever 161 for the mask 153 is connected by a flexible cord 164 (Figs. 4 and 11), led over guide pulleys 165 and 166, to a vertically swinging link 140. A small tension spring 167 yieldably urges the lever 161 to swing in a direction to move the mask 153 upward. As heretofore noted, the link 140 swings up and down in unison with the vertical movements of the gun and gun replica, wherefore the mask 153 moves vertically in unison with such vertical movements of the gun and gun replica. Similarly, the lower end of the supporting lever 162 for the other mask 154 is connected by a flexible cord 168 (Fig. 4) led over a guide pulley 169, to a laterally swinging link 132. As a consequence, the mask 154 is caused to move vertically in unison with the lateral swinging motion of the gun and gun replica, the lever 162 being yieldably biased by a tension spring 167a (Fig. 15).

From the foregoing it will be seen that the position of the movable mask apertures 155, 156 is governed by the position of the gun and gun replica, while the position of the apertures 151, 152 in the control tracks is determined by the location of the target image. The correlation of the parts is such that when the gun replica 47 is accurately aimed at the projected target image, there will be registration between apertures 151, 155 and apertures 152, 156. As a consequence light is admitted from the scanning lamp 157, through these two pairs of registering apertures, to the phototube 147. Such light falling on the phototube reduces its resistance in the usual manner so that its output current, when amplified by the amplifier 148, is adequate to actuate the relay 143. It will, therefore, be appreciated that a very effectual system has been provided for detecting accurate aiming with respect to a projected moving picture target. Particularly to be observed in this connection is the fact that although the gun 41 is comparatively free for manipulation by the operator and may be of full size, that the moving picture projection apparatus and screen as well as the associated "hit" detection apparatus are all housed in a single casing of fairly small size. Thorough protection is thus afforded the more delicate parts, and full portability is afforded.

Coin controlled starting system

Figure 19:
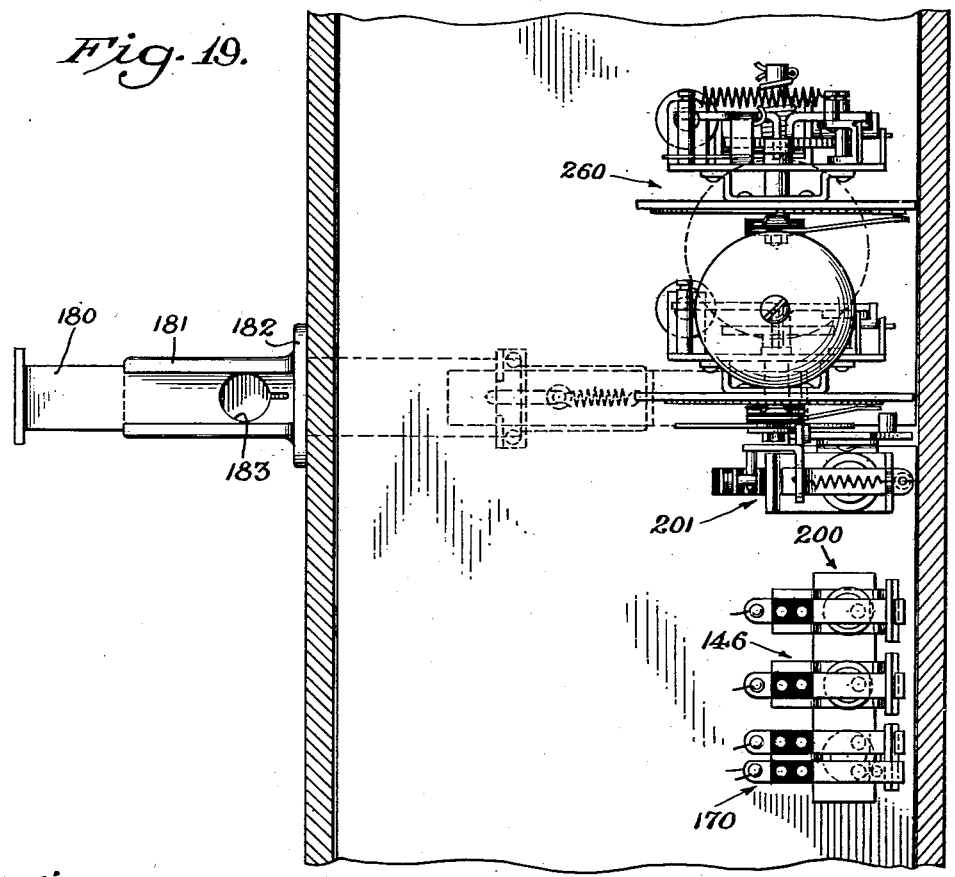
Fig. 19 is a partial horizontal sectional view through the scoring mechanism, being taken substantially along the line 19—19 in Fig. 1.
Figure 20:
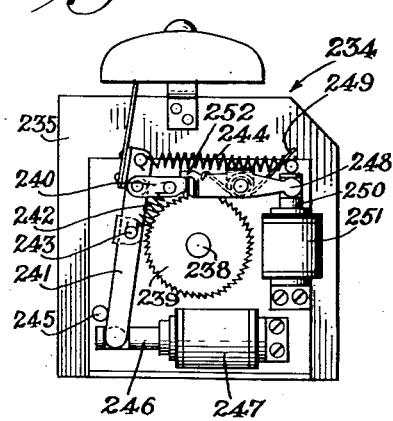
Fig. 20 is a detail view of the ratchet mechanism for the units counter included in the scoring mechanism.
Figure 21:
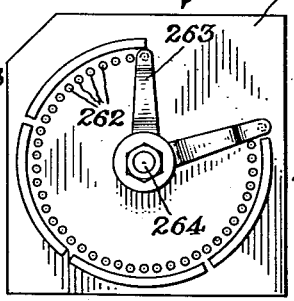
Fig. 21 is a detail view of the rotary type multi-point contractor of the tens counter included in the scoring mechanism.
Figure 22:
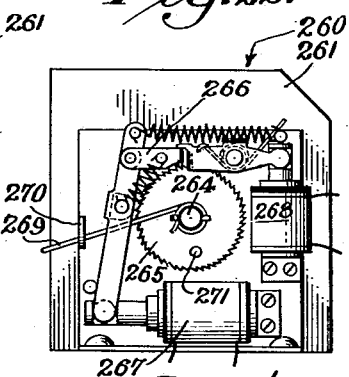
Fig. 22 is a detail view of a second ratchet type actuator, in the case for the tens counter, included in the scoring mechanism.

Since the particular form of apparatus illustrated is intended primarily as an amusement device, it has been provided with a suitable coin controlled mechanism for starting it. A coin slide 180 of conventional form (Figs. 1, 17, 19 and 23) is arranged to slide endwise in the usual tubular metal housing 181, fixed on the front of the casing 50 by an escutcheon plate 182. A coin is placed in the opening 183 in this slide (Fig. 19) and as the slide is thrust inward the coin frees a detent (not shown) in the usual manner for such slides, so as to permit the full inward travel of the slide 180, the coin finally falling through an aperture 184 (Fig. 23) in the bottom of the metal housing 181 and thence into a suitable coin receiver (not shown). A tension spring 185 (Fig. 17) normally urges the coin slide 180 to its outer position.

In brief, the full inward movement of the coin slide 180, permitted when it carries a coin, is utilized to start the projector drive motor 75, condition the scoring circuit for operation, and reset to zero the score counter mechanism in the casing 50.

A lockout mechanism is provided for disabling the coin slide 180 from performing its usual starting functions when the coin is inserted during a time when the machine is disconnected from a suitable source of current. This lockout mechanism comprises a lockout solenoid 186 (Fig. 23) having a movable armature 187 which is normally urged by tension spring 188 to the position shown in dotted lines in Fig. 23. Upon energization of the solenoid 186 the armature 187 is pulled into the full line position shown in Fig. 23. When the armature 187 is in the latter position it is out of the path of the downwardly projecting nose 189 of a slide 190, but when the armature 187 is in the dotted line position shown in Fig. 23 it blocks forward movement of the slide 190. This latter slide 190 forms, in effect, an extension of the inner end of the coin slide 180, although it is yieldably connected to the actual coin slide so that the latter may be thrust inward without breaking any of the parts, even when the inner slide 190 is locked against movement.

In order to form a yieldable connection, of the character indicated above, between the coin slide 180 and the inner slide 190, these two slides are disposed in superposed relation as shown in Figs. 17 and 23 and an intermediate slide 191 placed between them. The intermediate slide 191 has a depending projection 192 on its inner end which ii disposed in the path of the coin slide 180, whereby the slide 191 will be carried inward with the coin slide. A tension spring 193, anchored at its opposite ends to a pin 194 on the intermediate slide 191 and to a screw 195 on the inner slide 190, forms a yieldable connection between the slides 190 and 191. It will be observed in Fig. 23 that the screw 195 passes through an elongated slot 191a in the intermediate slide 191. Therefore when the slide 190 is unlocked, inward movement of the intermediate slide 191 by the coin slide 180 will also thrust the slide 190 inward. In the event, however, that the slide 190 is locked against movement, the slides 180 and 191 will move inward, but will simply stretch the spring 193 and no movement of the inner slide 190 will result. Tension spring 196 yieldably urges the inner slide 190 to its retracted position. Guide brackets 197 and 198 restrain the slides 190 and 191 against lateral movement and guide them for their desired endwise movement.

When the slide 190 is thrust inward it performs two functions, namely, to reset a trip relay 201 (Figs. 17, 18 and 25), and to mechanically reset one of the counters of the scoring mechanism. The latter function will be described in connection with the subsequent description of the scoring mechanism itself. As to the resetting of the trip relay 201, it will be observed, upon reference to Fig. 25, that the trip relay comprises a solenoid 202, which is arranged, upon energization, to attract an armature 203. This armature is normally urged to the upward position shown by Fig. 25 by a tension spring 204. The armature 203 passes through an aperture 205 in a pivotally mounted arm 206, such arm being urged to move in a clockwise direction (as viewed in Fig. 25) by a tension spring 207. An offset shoulder 208 in the armature 203 engages the arm 206 when the parts are disposed as shown in Fig. 25, and thus holds the arm 206 in the position shown and with the spring 207 tensioned. Upon attraction of the armature 203 by the solenoid 202, the arm 206 is freed to swing in a clockwise direction and will remain pulled over to the right (as viewed in Fig. 25) until it is mechanically thrust back into the latched position shown in such figure. In other words, after the arm 206 has once been unlatched by attraction of the armature, any subsequent reenergization of the solenoid 202 will be ineffective to relatch the arm.

The swinging arm 206 of the trip relay 201 serves to operate two pairs of switch contacts 209, 210 and 211, 212 (Fig. 25). The contacts 209 and 211 are carried on stationary spring fingers 213 and 214, respectively, while the movable contacts 210, 212 are carried on laterally flexible spring fingers 215, 216 joined by the transverse pin 217. A projection 218 on the arm 206 has a lug 219 on its inner end which is engageable with the spring finger 216. When the arm 206 is in its latched position shown in Fig. 25, the spring fingers 215, 216 occupy their position shown and in which the two pairs of switch contacts are closed. However, when the arm 206 is unlatched and pulled to the right by its tension spring 207, the spring fingers 215 and 216 are also pulled to the right and both pairs of contacts are opened.

Relatching of the trip relay 201 is accomplished by the slide 190 through the medium of a swinging lever 220 (Figs. 17, 18 and 25). The lever 220 is pivoted intermediate its ends on a pin 221 and has a projection 222 on its lower end which is disposed in the path of the projection 189 on the inner end of the slide 190. Thus, as the slide 190 is moved inward by the coin slide 180, the lever 220 is swung counterclockwise (as viewed in Fig. 17) and engages a lateral projection 223 on the arm 206 of the trip relay (Fig. 18), thereby thrusting the arm 206 into its latched position.

Operation of the coin slide 180 serves not only to reset the trip relay 201 as described above, but in addition serves to actuate a set of three switches included in the control circuits of the apparatus. Upon reference to Fig. 23, it will be observed that these three switches comprise, respectively, three pairs of contacts 224, 225; 226, 227; and 228, 229; all carried by suitable spring fingers insulated from each other. As appears in Fig. 23, the sets of contacts 224, 225 and 228, 229 are normally closed, while the middle pair of contacts 226, 227 is normally open. This relationship is effected by providing extensions on the fingers which support the contacts 224 and 227, which are engaged by the projection 192 on the intermediate slide 191 when the latter is in its outermost position. When the intermediate slide 191 is thrust inward by the coin slide 180, the contacts 226, 227 close, while the other two pairs of contacts 224, 225 and 228, 229 open. From this it will be seen that the three switches in question occupy the position shown in Fig. 23 both during the operation of the machine and while it is idle, and that they are shifted to the alternative positions described simply during the short interval that the coin slide 180 is thrust inward for starting the machine. The functions of these three switches in conditioning the apparatus for operation will be hereinafter detailed.

*Scoring mechanism*

Automatic scoring mechanism is provided in the illustrative machine for registering continuously the number of "hits" made. After a predetermined length of film has been run off, the projector 64 is stopped, as heretofore described, and at the same time the scoring mechanism is disabled against further operation. Thereafter, when the projector is restarted by insertion of another coin in the machine, the scoring mechanism is automatically reset to zero and conditioned for operation. The presently disclosed scoring mechanism is particularly suited for use with a shooting aparatus such as that described in that it is capable of operation at the high speed necessary under conditions of rapid fire for the gun.

Upon reference to Fig. 2, it will be seen that a scoreboard is provided on the upper face of the casing 50 and which comprises a translucent glass panel 230 (see also Fig. 17) on which are painted digits 1 to 9, multiples of ten from 10 to 90, and multiples of one hundred from 100 to 400. Beneath each of the digits or units 1 to 9 is located a lamp 231, beneath each of the "tens" is located a lamp 232, and beneath each of the "hundreds" is a lamp 233. As successive "hits" are scored, appropriate ones of these lamps are lighted to indicate the total number of "hits" made. As appears in Fig. 17, the lamps are disposed in suitable individual recesses in an opaque panel 230a, which is fixed in position beneath the glass panel 230.

The counter mechanism for lighting successive ones of the "unit" lamps 231 comprises a rotary-type contactor, designated generally as 234 in Figs. 17, 18, 20, 24 and 26. This contactor comprises an upright insulating board 235 on which is mounted a circular series of contact buttons 236. There are fifty such contact buttons in all, connected in five similar groups of ten each (see Fig. 26 for connections). Thus, the first button in each group of ten has no connection, since it corresponds to the zero setting of the counter, the next button in each group is connected to the "1" lamp, the next button to the "2" lamp, etc. A rotary brush 237 is fixed to a shaft 238 at the center of the series of buttons 236 and is adapted to contact them successively. As the brush 237 contacts successive ones of the buttons 236 it establishes electric supply connections to the corresponding lamps so that they are illuminated one after another.

A ratchet-type of mechanism is provided for advancing the rotary contactor brush 237 step-by-step as successive "hits" are made. This ratchet mechanism comprises (Fig. 20) a ratchet wheel 239 fixed to the shaft 238 and a cooperating pawl 240. The pawl is pivotally mounted on a lever 241, being yieldably urged into engagement with the ratchet wheel by a tension spring 242. The lever 241 is pivotally mounted intermediate its ends by a pin 243, and its upper end is pulled to the right (as viewed in Fig. 20) by a tension spring 244, such movement being limited by a stop pin 245. The lower end of the lever 241 is pivotally connected to the slidable armature 246 of a solenoid 247. Energization of the solenoid 247 swings the lever 241 counterclockwise, and upon subsequent deenergization of the solenoid the spring 244 pulls the lever 241 back in a clockwise direction, with the result that the pawl 240 advances the ratchet wheel 239.

A back-up pawl 248 is provided for the ratchet wheel 239, being urged into engagement therewith by a torsion spring 249. The back-up pawl is pivoted intermediate its ends, its inner end being engageable with the ratchet wheel, and its outer end being pivotally connected to the slidable armature 250 of a reset solenoid 251. The inner end of the back-up pawl 248 is also loosely connected with the actuating pawl 240 by a lug 252. By virtue of this connection, when the reset solenoid 250 is energized, both of the pawls 240 and 248 are lifted out of engagement of the ratchet wheel 239 so that the latter can revolve freely during the reset of the "unit" counter.

Resetting of the "unit" counter is accomplished mechanically upon operation of the coin slide 180. For this purpose a star wheel 253 (Figs. 18 and 24) is fixed to the shaft 238 and disposed for engagement by a laterally projecting pin 254 on the upper end portion of the lever 220. It will be recalled from the previous description that this lever 220 is actuated in response to movement of the coin slide to effect resetting of the trip relay 201, the lever being shiftable from the dot-dash line position of Fig. 24 to the full line position shown therein when the coin slide is thrust inward. This same motion of the lever 220 also resets the "unit" counter contactor 234, since the pin 254 engages the star wheel and moves into the root of any one of the interdental spaces on the star wheel in which it happens to be located, thereby turning the latter to a corresponding fixed angular position. It will be observed that there are five interdental spaces on the star wheel, i. e., a number equal to the number of sets of contact buttons 236. The interdental spaces on the star wheel are so related to the position of the contact brush 237 and contact buttons 236 that when the star wheel is positioned by the lever 220 the brush 237 will always be set in one of its zero positions, or in other words in contact with the first one of the buttons 236 in one of the five groups of such buttons. It will thus be seen that a very simple and speedy reset for the contactor 234 of the "unit" counter is provided.

The "tens" counter comprises a rotary contactor 260 (Figs. 18, 21, 22 and 26) for lighting the "tens" lamps 232, this contactor being somewhat similar to that for the "unit" counter described above. This contactor 260 comprises a vertical insulating panel 261 having thereon a circular series of contact buttons 262. In the present instance there are forty such contact buttons arranged in groups of ten, with the first button in each group unconnected to any lamp, the second button in each group connected to the "10" lamp, the third button connected to the "20" lamp, etc. A rotary contact brush 263, fixed to a shaft 264, is arranged to engage successive ones of the contact buttons 262.

A pawl and ratchet mechanism (see Fig. 22) is provided for advancing the brush 263 step-by-step. This pawl and ratchet mechanism is substantially identical with that heretofore described for the "unit" counter shown in Fig. 20, wherefore detailed description of the same is unnecessary. It is sufficient to note that it comprises a ratchet wheel 265 and an actuating pawl 266, as well as an operating solenoid 267 and a resetting solenoid 268. In the case of the "tens" counter a spring return is used for resetting the same to zero, rather than a star wheel mechanism, such as that heretofore described for the "unit" counter. For this purpose a torsion spring 269 is coiled about a shaft 264, having one end anchored thereto and the other end slidably held within a stop projection 270 on the supporting panel 261. As the rotary contact brush 263 advances, the spring 269 is coiled up about the shaft 264. Thereafter, when the reset solenoid 268 is energized to release the ratchet wheel 265, the spring 269 revolves the shaft 264 in an opposite direction to unwind the spring. Finally, a stop pin 271 on the ratchet wheel engages the spring and stops the motion of the ratchet wheel when the contact brush 263 has been restored to its initial zero position.

The "hundreds" lamps 233 are also supplied with current under the control of additional contacts on the rotary contactor 260. For this purpose four arcuate contacts 275, one for each of the lamps 233, are provided and are arranged with a blank space 276 between the adjacent ends of the first and last ones of these arcuate contacts. A rotary brush 277, revoluble with the brush 263, is arranged to establish contact with the arcuate contacts 275. The blank space at 276 corresponds to the zero position for the "hundreds" counter and as the brush 277 revolves it comes into contact with successive ones of the arcuate contacts 275 thereby lighting successive ones of the "hundreds" lamps 233. The brush 277 is, of course, reset to zero position coincidentally with the brush 263 in the manner heretofore described since these two brushes are fixed together.

Résumé of operation

Figure 26:
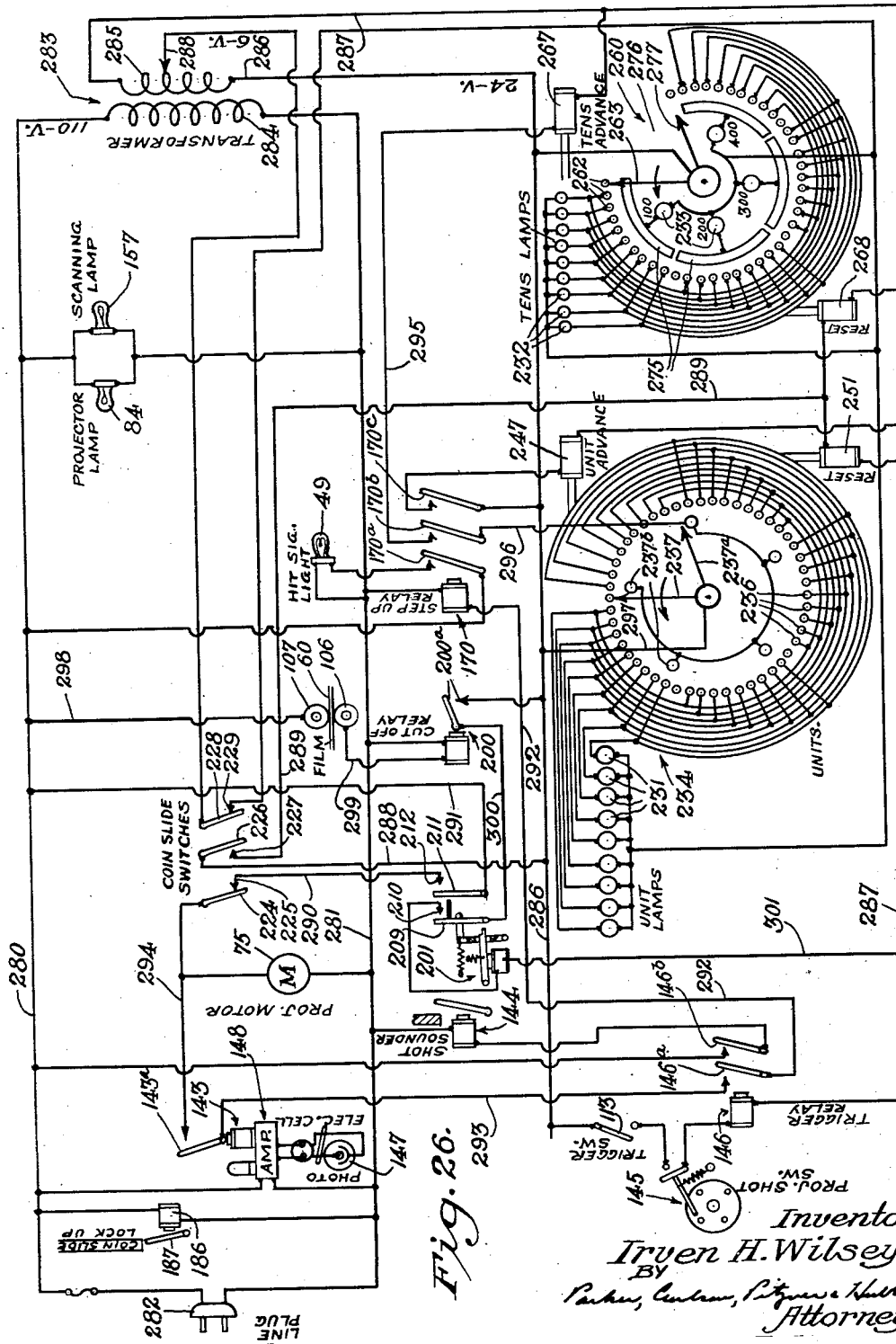
Fig. 26 is a wiring diagram of the apparatus.

Having in mind the foregoing description of the various elements of the apparatus, the cycle of operation of the same can best be followed by reference to the wiring diagram of Fig. 26. As there indicated, current is supplied to lines 280 and 281 from a line plug 282 connected to a suitable current source, such, for example, as an ordinary 110-120 volt lighting circuit. Suitable low voltage for certain instrumentalities in the apparatus is derived from the lines 280, 281 by a transformer 283 having a primary winding 284 and a tapped secondary winding 285. In the present instance 24 volt current is available across lines 286, 287 connected to the end terminals of the secondary, and 6 volt current across lines 286, 288.

Upon connecting the plug 282 to a source of current, the coin slide lockup solenoid 186 is energized, thereby freeing the inner slide 190 for operation in conjunction with a coin slide 180 as heretofore described. At the same time the projector lamp 84 and scanning lamp 157 are lighted and the transformer 283 is energized. It is to be observed that the projector motor 75 does not start since it is open-circuited by the trip relay 201 whose contacts are latched in open position.

Operation of the machine is initiated by inserting a coin in the coin slide 180 and momentarily thrusting the latter inward as heretofore described. Such actuation of the coin slide thrusts the movable contacts 209 and 211 of the trip relay 201 into closed position. Coincidentally, the coin slide switch contacts 226—227 are momentarily closed and the sets of contacts 224—225 and 228—229 are momentarily opened. Such closing of the contacts 226—227 energizes the scoring mechanism reset solenoids 251 and 286 (through a circuit 286—288—226—227—289—251 and 268—287). As was heretofore described the energization of the reset solenoids 251 and 268 frees the respective "unit" and "tens" rotary counters for resetting, the "unit" counter being thereupon reset by the star wheel mechanism and the "tens" counter by its reset spring 269. The opening of the coin slide switch contacts 228—229 open-circuits all of the lamps 231—233, so that they are extinguished during the resetting of the counters.

As the coin slide 180 moves back out to its original position the coin slide switch contacts 224, 225 reclose, thereby energizing the projector motor 75 (through a circuit 281—75—224—225—290—212—211—291—280). At the same time the reset control contacts 226, 227 of the coin slide switch mechanism are reopened and contacts 228, 229 in the lamp supply circuit are reclosed, the latter making current available from the 6 volt lines 286, 288 for the lamps.

With the projector motor 75 thus started the moving picture target scene from the film 60 is projected on the screen 45. As heretofore noted, this may consist of almost numberless subjects such, for example, as airplanes in flight, soldiers moving across the battlefield or, wild animals prowling through a jungle. The user of the machine has the stock of the gun 41 pressed against his shoulder and has the impression, from his view of the gun replica 47, that he actually sees the gun itself in conjunction with the target scene. He swings the gun 41 to aim it (actually to aim the replica 47) at the target image which appears in the scene projected on the screen 45. When the operator believes that he has accurately aimed the gun at the target image he presses the gun's trigger 48 (Fig. 1) thereby closing the trigger switch 113.

Closure of the trigger switch 113 (Fig. 26) completes a circuit from the 24 volt line 286 to the projector shot switch 145. This latter switch is periodically closed in timed relation to the operation of the projector 46, there being one closure of the same for the exposure of each two successive pairs of frames on the film 60. Simultaneous closure of the switches 113 and 145 connects the actuating winding of the trigger relay 146 across the 24 volt lines 286—287 thereby energizing the same so that this relay's contacts 146$^a$ and 146$^b$ are closed. The purpose of interposing the projector shot switch 145 in series with the trigger switch 113 is twofold. First of all it is desirable that a periodic switch, timed with the projector operation, be used so that the trigger switch will be rendered operative only at an instant when a frame of the film 60 is in position for projection as distinguished from the period when such a frame is moving into position. Secondly it is desirable that the trigger switch be effective to complete a circuit only during the exposure of alternate pairs of frames on the film rather than during the exposure of every successive pair in view of the fact that the speed with which successive pairs of frames are shown is so great that it would compel the use of excessively expensive high speed relays throughout the control circuit. Cheaper and more sluggish relays can be used when a timing switch, such as the projection shot switch 145, is used to disable the circuits during the exposure of alternate sets of frames on the film.

Closure of the trigger relay contacts 146b connects the shot sounder solenoid 144 across the 110 volt lines 280—281, thereby energizing the same so that a sharp sound results from striking of its armature against the housing, simulating the sound of firing a gun. The other contacts 146a of the trigger relay are interposed in a scoring circuit and will complete the same in the event that the gun replica 47 is accurately aimed at the target image projected on the screen 45. Thus the step-up relay 170 is connected across the 110 volt lines 280—281 in series with the trigger relay contacts 146a and the contacts 143a of the sight-controlled relay 143 (through a circuit 281 — 170 — 292 — 146a — 293—143a—294—224—225—290—212—211—291—280).

The closure of the relay contacts 143a, to complete the energizing circuit for the step-up relay 170 noted above, depends upon the accurate aiming of the gun replica 47 at the projected target image. In the event that the gun replica is accurately aimed at the target image, the slots 155 and 156 in the movable masks 153 and 154 (Fig. 14), moved through the medium of the linkage heretofore described, are brought into registry with the corresponding mask apertures 151 and 152 on the film control tracks (Fig. 5) whereby sufficient light is admitted from the scanning lamp 157 to the phototube 147 to cause energization of the relay 143. It will thus be seen that when conditions for accurate gun fire are met, that is to say, pulling of the trigger at the instant that the gun is accurately aimed at the target, the relay contacts 146a and 143a will be simultaneously closed, thus completing the energizing circuit heretofore noted for the step-up relay 170.

Energization of the step-up relay 170 closes all three of its contacts 170a, 170b and 170c. The contacts 170a connect the "hit" signal lamp 49 across the 110 volt lines 280—281, thereby illuminating the same so that this lamp momentarily floods the target scene with a red glow to indicate that a "hit" has been made. The closure of the contacts 170c connects the "unit" counter's advance-solenoid 247 across the 24 volt lines 286—287, thereby momentarily energizing the same so that the pawl and ratchet mechanism advances the rotary brush 237 of the "unit" counter one step. This first step of advance of the "unit" counter causes the brush 237 to complete a circuit for the first of the lamps 231, connecting it across the 6 volt lines 286, 288, so that this lamp is illuminated to indicate that one "hit" has been made. As each successive "hit" is made the "unit" counter is advanced one further step.

Upon each actuation of the step-up relay 170 its contacts 170b are also closed. These contacts are in series with the advance solenoid 267 for the "tens" counter. They are, however, ineffective to energize the solenoid 267 until the brush 237 of the "unit" counter has advanced through nine steps. As the brush 237 of the "unit" counter moves from its ninth to its tenth position, a supplemental rotary brush 237a in the "unit" counter (rigid with the brush 237 and rotated in unison therewith) engages one of five stationary contacts 237b. Thereupon the solenoid 267 for advancing the "tens" counter is momentarily energized (through a circuit 237—267—295—170b—296—237b—237a—297—286) so that the "tens" counter is advanced one step by its pawl and ratchet mechanism.

It is to be observed that the "unit" rotates in one direction for indicating digits 0 to 9 through any desired number of repetitions of the series and also causes the "tens" counter to turn a step upon completion of each such series. No resetting of the "unit" is required until all swing is completed, thus assuring the necessary high speed operation for use when rapid fire operation is taking place.

The operation described above continues as successive "hits" are made, the total score being indicated continuously on the illuminated scoreboard. When the end of the moving picture sequence is reached the control apertures 112 in the moving picture film 60 come into position between the metal rollers 106, 107 thereby completing a circuit for the cut-off relay 200. Thus the cut-off relay is connected across the 110 volt lines 280, 281 (Fig. 26) through a circuit 280—298—107—106—299—200—281. Such energization of the cut-off relay 200 causes it to close its contacts 200a, thereby connecting the trip relay 201 across the 24 volt lines 286, 287 (through a circuit 286—200a—300—209—210—201—301—287). This energization of the trip relay 201 causes it to shift its movable contacts 209 and 211 to open position where they are latched open as heretofore described. The energizing circuit for the trip relay is interrupted by opening of its own contacts 209—210 while the circuit for the projector motor 75 is interrupted by the contacts 211—212, thus stopping the projector motor. A separate cut-off relay 200 is used for operating the trip relay 201, as distinguished from energizing the trip relay itself directly by the circuit through the rollers 106—107 since the trip relay requires a fairly high current and it is undesirable to use such current between the rollers where arcing is likely to occur.

It will thus be seen that the machine stops with the trip relay latched open and the other control elements of the apparatus in the condition heretofore described for the initiation of operation. The general cycle described is repeated upon subsequent operation of the coin slide 180. As heretofore noted, such actuation of the coin slide results in resetting of the scoring counter and starting of the projector motor 75.

*Modified film and coordinated scoring control system*

In Fig. 27 has been illustrated a modified form of motion picture film suitable for use in a slightly modified apparatus of the general character heretofore described. The motion picture film 310 of Fig. 27 comprises a target track 311 and a single control track 312, as contrasted with the double control track arrangement of the film shown in Fig. 5 and heretofore described. The target track 311 is made up of successive pairs of frames 311R and 311L, the frames in each pair being disposed side-by-side longitudinally of the strip of film, rather than transversely of the film as in the film 60 shown in Fig. 5. As before, the pairs of frames bear images taken at a suitable optical angle to each other so that when projected simultaneously, and viewed by the respective right and left eyes of a user, a stereopticon or three-dimensional effect will be produced.

In view of the layout described for the pairs of frames on the target track 311, it is desirable to arrange the projector for the film 310 so that the film passes horizontally in front of the viewer rather than vertically as shown in Fig. 4. This entails merely a turning of the projection apparatus through ninety degrees and consequently illustration of such rearrangement of position of the projecting apparatus is unnecessary.

The control track 312 is made up of a succession of opaque masks, one for each pair of frames on the target track 311 and which appear as a continuous opaque band on the film. In each of the opaque masks of the control track 312 is an aperture 313, the position of such aperture being coordinated both laterally and longitudinally with the lateral and longitudinal displacement of the target image in a corresponding pair of the frames 311R, 311L.

When utilizing the film 310 of Fig. 27 light from the scanning lamp 157 is arranged to fall on the phototube 147 (both of which elements were heretofore described) upon accurate aiming of the gun with relation to the projected target image, just as before. The modified apparatus is substantially the same except that a modified form of gun-operated mask is required for coaction with the single control track 312. Consequently, only that modified portion of the apparatus has been shown in Figs. 28 to 30, the remainder being unaltered.

As shown in Figs. 28 to 30, the film 310 passes between the opposed faces of a sheet metal mask 314 and a guide plate 315. The mask 314 has a round aperture 316 therein, matching the size of the transparent apertures 313 in the control track 312. The stationary guide plate 315 has, on the other hand, a large aperture 317 therein, of an area equal to the total area of the mask on the control track 312, and this aperture 317 is underlaid by a protective transparent plate 317ᵃ. Thus, when the control mask aperture 316 registers with a track aperture 313, light is free to pass from the scanning lamp 157 to the phototube 147 to cause an energization of the scoring circuit heretofore described.

Since a single control mask 314 is utilized for coaction with a control track in which the control track aperture has both a lateral and longitudinal displacement, the control mask 314 must itself have freedom of movement in two directions. In the present instance the mask 314 is fixed between arms 318 depending from the yoke-shaped forward end of a lever 319. This lever 319 has depending yoke arms 319ᵃ at its rear end which are journaled on transverse pivot pins 320. These pins 320 are carried on a head 321 which is in turn journaled by pivot pins 323 on a bracket 322 for swiveling motion about a vertical axis. The lever 319 may thus be swung laterally about the axis of the pins 323 or vertically about the axis of pins 320 to impart correspondingly lateral and vertical motion to the mask 314.

Fixed on the front of the head 321 is a depending L-shaped arm 324, the lower extremity of which is connected to a tension spring 325 and to the control cord 168 heretofore described (see Fig. 4 for layout of control cord). The spring 325 urges the lever 319 and mask 314 to swing clockwise (as viewed in Fig. 29). Similarly, the depending lower end of one of the arms 319ᵃ is connected to a tension spring 326 and to the control or operating cord 164 heretofore described. The spring 326 yieldably urges the lever 319 and mask 314 to swing clockwise (as viewed in Fig. 28). The operating or control cords 164 and 168 are moved in accordance with the movement of the gun replica 47, in the manner heretofore described, and accordingly the mask 314 moves in unison therewith both laterally and vertically so that the control mask aperture 316, in effect, scans the area of the control track mask on the film which is located beneath the same. Upon accurate aiming of the gun replica at the projected target image on the screen 45 (Fig. 4), the control mask aperture 316 will be brought into registry with the underlying control track aperture 313, whereupon light is admitted from the scanning lamp 157 to the phototube 147. The effect of admission of light to the phototube 147 is the same as that heretofore described in connection with the previous description of operation of the apparatus as a whole.

I claim as my invention:

1. In an apparatus of the type set forth, the combination of a casing having a moving picture screen therein and a viewer thereon through which images projected on the screen may be viewed, a full-sized gun disposed adjacent said casing and having a stock positioned to be pressed against a user's shoulder when he is in position to peer through said viewer, a replica of the fore portion of the gun disposed in said casing in position to be seen through said viewer in conjunction with a target scene projected on said screen, means supporting said gun for both horizontal and vertical swinging movement about a point located adjacent the butt end of the gun, a link in said casing pivoted for both horizontal and vertical movement about one end thereof, means for moving said link in unison with said gun, and means forming a yieldable operating connection between said replica and said link for causing said replica to move in unison with said link.

2. In an apparatus of the type set forth, the combination of a casing having a moving picture screen therein and a viewer thereon through which images projected on the screen may be viewed, a full-sized gun stock disposed adjacent said casing and positioned to be pressed against a user's shoulder when he is in position to peer through said viewer, a small-sized replica of the fore portion of a gun disposed in said casing in position to be seen through said viewer in conjunction with a target scene projected on said screen, means supporting said gun stock for both horizontal and vertical swinging movement similar to the movement to which a gun is subjected in actual use, means supporting said small-sized replica for swinging movement both horizontally and vertically, and means including a mechanical connection between said full-sized gun stock and said small-sized replica for moving the replica in unison with the gun stock and through substantially corresponding angles, said viewer including optical eye pieces for causing the viewed replica to appear full sized and to appear to be fastened to the stock pressed against the user's shoulder.

3. In an apparatus of the type set forth, the combination of a casing, an optical viewer, a moving picture screen in front of said viewer and adapted to be illuminated by images projected thereon from behind the screen, a gun disposed adjacent said casing and adapted to be gripped by the user when he is in position to peer through said viewer, a small-sized replica of the fore portion of said gun disposed in said casing so that the forward end thereof extends to within a short distance of said screen, means for supporting said gun for both horizontal and vertical swinging movement in the hands of the user to simulate actual use, means supporting said replica for swinging movement both horizontally and vertically, means including a mechanical connection between said gun and said small-sized replica for moving the replica in unison with said gun and through substantially corresponding angles, both said screen and said replica being located within a few inches of the viewer, said viewer including optical eye pieces for bringing said screen and the fore portion of said replica into focus whereby said small-sized replica and the image on said screen appear to be full-sized.

IRVEN H. WILSEY.

REFERENCES CITED

The following references are of record in the file of this patent:

UNITED STATES PATENTS

| Number | Name | Date |
|---|---|---|
| 1,120,577 | Wiese | Dec. 8, 1914 |
| 1,207,411 | Keen | Dec. 5, 1916 |
| 1,477,541 | Clement et al. | Dec. 18, 1923 |
| 1,494,795 | Muller | May 20, 1924 |
| 1,559,893 | Lane et al. | Nov. 3, 1925 |
| 1,591,081 | Curtis | July 6, 1926 |
| 1,642,918 | Bouin | Sept. 20, 1927 |
| 1,793,772 | Bouma | Feb. 24, 1931 |
| 1,801,656 | Burkhardt | Apr. 21, 1931 |
| 1,819,954 | Hansen | Aug. 18, 1931 |
| 1,841,262 | Wallace | Jan. 12, 1932 |
| 1,929,518 | Ross | Oct. 10, 1933 |
| 1,953,538 | Mittell | Apr. 3, 1934 |
| 1,971,828 | Morton | Aug. 28, 1934 |
| 2,101,121 | Wixon | Dec. 7, 1937 |
| 2,139,210 | Saurebier | Dec. 6, 1938 |
| 2,212,257 | New | Aug. 20, 1940 |
| 2,230,149 | Weddington | Jan. 28, 1941 |
| 2,269,410 | New | Jan. 6, 1942 |
| 2,275,797 | New | Mar. 10, 1942 |
| 2,406,574 | Waller et al. | Aug. 27, 1946 |